(12) United States Patent
Tosaka

(10) Patent No.: US 9,256,610 B2
(45) Date of Patent: Feb. 9, 2016

(54) FILE DEDUPLICATION IN A FILE SYSTEM

(75) Inventor: Eiji Tosaka, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 13/534,735

(22) Filed: Jun. 27, 2012

(65) Prior Publication Data

US 2012/0271800 A1     Oct. 25, 2012

Related U.S. Application Data

(63) Continuation of application No. 13/240,042, filed on Sep. 22, 2011.

(30) Foreign Application Priority Data

Oct. 25, 2010   (JP) .................................. 2010-238487

(51) Int. Cl.
 *G06F 17/30* (2006.01)
 *G06F 11/14* (2006.01)

(52) U.S. Cl.
 CPC ...... *G06F 17/30156* (2013.01); *G06F 11/1453* (2013.01); *G06F 11/1464* (2013.01)

(58) Field of Classification Search
 CPC ............................................... G06F 17/30156
 USPC .......................................... 707/641, 692, 654
 See application file for complete search history.

(56) References Cited

U.S. PATENT DOCUMENTS

| | | | |
|---|---|---|---|
| 5,717,886 A * | 2/1998 | Miyauchi ....................... | 711/103 |
| 6,889,297 B2 * | 5/2005 | Krapp et al. .................. | 711/159 |
| 7,149,750 B2 | 12/2006 | Chadwick | |
| 7,797,279 B1 * | 9/2010 | Starling et al. ................ | 707/641 |
| 8,131,687 B2 * | 3/2012 | Bates et al. .................... | 707/692 |
| 8,229,985 B2 | 7/2012 | Turner et al. | |
| 8,321,374 B2 | 11/2012 | Holt et al. | |
| 8,468,320 B1 | 6/2013 | Stringham | |
| 2006/0179037 A1 * | 8/2006 | Turner et al. ................... | 707/3 |
| 2009/0132619 A1 | 5/2009 | Arakawa et al. | |
| 2009/0144300 A1 | 6/2009 | Chatley et al. | |

(Continued)

FOREIGN PATENT DOCUMENTS

| JP | 05135108 A | 6/1993 |
|---|---|---|
| JP | 2001057564 A | 2/2001 |
| JP | 2003524243 A | 8/2003 |
| JP | 2004280283 A | 10/2004 |
| JP | 2005050165 A | 2/2005 |

(Continued)

*Primary Examiner* — Apu Mofiz
*Assistant Examiner* — Chelcie Daye
(74) *Attorney, Agent, or Firm* — Griffiths & Seaton PLLC

(57) ABSTRACT

Each file is assigned in advance with a WWUID, newly assigned to a file upon the creation or update of the file and inherited from a file to a copied file when it is copied. In a backup apparatus, a file name reception unit receives the file name of a backup target file. A WWUID reception unit receives a WWUID corresponding to the file name. A WWUID search unit searches for the same WWUID in backup management information of a previous day stored in a backup destination. Only if the search is failed, a file operation instruction unit instructs the storing of the backup target file into the backup destination. Then, an Rcnt update instruction unit instructs the updating of the number of references made to the WWUID within the backup destination. A second management information update instruction unit then instructs updating of backup management information of the current day.

4 Claims, 21 Drawing Sheets

(56) References Cited

U.S. PATENT DOCUMENTS

| | | |
|---|---|---|
| 2009/0144343 A1 | 6/2009 | Holt et al. |
| 2009/0150477 A1 | 6/2009 | McClanahan et al. |
| 2010/0306176 A1 | 12/2010 | Johnson et al. |
| 2012/0036107 A1 | 2/2012 | Miloushev et al. |

FOREIGN PATENT DOCUMENTS

| | | |
|---|---|---|
| JP | 2009116839 A | 5/2009 |
| JP | 2009237979 A | 10/2009 |
| JP | 2009282604 A | 12/2009 |
| WO | 2010100733 A1 | 9/2010 |

* cited by examiner (a)

(b)

FILE DEDUPLICATION IN A FILE SYSTEM

PRIORITY CLAIM

This application is a Continuation of U.S. patent application Ser. No. 13/240,042, filed Sep. 22, 2011, which claims priority to Japanese Patent Application No. 2010-238487, filed Oct. 25, 2010, which is hereby incorporated by reference in its entirety.

BACKGROUND OF THE INVENTION

1. Field of the Invention

The present invention relates generally to computers, and more particularly to mechanisms for file deduplication in a computing storage environment.

2. Description of the Related Art

As for backup of data in a computer system, an ideal backup in view of data reproduction (restoration) is a full backup in which all the target data are backed up periodically (e.g., every day). One of the reasons is that data saved by a full backup can be reproduced by a single restoration. Another reason is the simplicity of backup management because the generations (old or new) of backups are so clear that the backup of the necessary generation can be kept while the backup of the older generation can be deleted.

A full backup, however, has a disadvantage of requiring wasteful amounts of storage capacity and backup time. The biggest reason why the full backup requires such amounts of storage capacity and backup time is nothing but duplicate backup of data that is not changed every day.

Duplicate data backups occur also due to the backup of the same file that is possessed by multiple users. In an exemplary case of backing up data in multiple PCs (personal computers), the system files of the OS and the files of some application programs are included duplicately in the backup data of all the PCs, despite that these files do not differ from one machine to another. Further, in another exemplary case, an electronic mail document, or a large attachment file in particular, is possessed by multiple users and is included duplicately in backup data. There are various other possible situations where data duplication occurs.

To address these disadvantages, techniques for data duplication have been proposed. In one conventional technique, a directory identifier is generated for each of directories included in a reference file system and a target file system. If the directory identifier of a directory in the reference file system does not match the directory identifier of a directory in the target file system, a file identifier is generated for each file in these directories of the reference file system and the target file system. The file identifiers are then compared. Then, a file data comparison is made between a pair of files with matched file identifiers. If there is a match in the file data, the data duplication is eliminated. Here, as a method for generating the directory identifiers, there is a method in which hashing is performed on character strings of file names and sizes outputted by executing the du command for a target directory on for example the Linux (registered trademark) OS. In addition, as an exemplar method for generating the file identifiers, there is a method in which a hash value is acquired based on file data of each file.

As described in the conventional technique above, the generation and comparison of file identifiers (hash values of file data), which require a longer time than the generation and comparison of directory identifiers, are omitted for files included in pairs of directories with matched directory identifiers. Thus, the time required for data deduplication can be considered shortened as compared to the case where hashing is performed for every single file data in the reference file system and the target file system.

Nonetheless, the generation and comparison of file identifiers (hash values of file data) are performed for files included in pairs of directories without matched directory identifiers. That is, duplication is eliminated by utilizing file data. So, the time required for file deduplication cannot be expected to be shortened remarkably. Moreover, with the method using the hash value of file data as in the aforementioned technique, it is difficult to eliminate deduplication of multiple duplicate files without utilizing the file data thereof if at least one of the duplicate files is compressed or encrypted.

SUMMARY OF THE DESCRIBED EMBODIMENTS

The present invention, in one embodiment, includes mechanisms for shortening the time required for deduplication of a file without utilizing file data thereof. Additionally, these mechanisms allow deduplication of multiple duplicate files without utilizing file data thereof even when at least one of the duplicate files is compressed or encrypted.

Accordingly, in one embodiment, the present invention provides an apparatus for file deduplication in a file system, comprising: an acquisition unit configured to acquire identification information which is newly assigned to a file upon creation or update of the file and is inherited by the file from a different file if the file is a copy of the different file, to thereby make a content of the file identifiable; a determination unit configured to determine whether or not first identification information and second identification information match each other, the first identification information being the identification information acquired by the acquisition unit and assigned to a first file, the second identification information being the identification information acquired by the acquisition unit and assigned to a second file; and a control unit configured to perform such control that the first file and the second file are prevented from being stored as duplicate files in the file system, if the determination unit determines that the first identification information and the second identification information match each other.

In this apparatus, the acquisition unit may include: a first acquisition unit configured to acquire the first identification information assigned to the first file backed up to the file system at a first time point, from first management information for managing each file backed up to the first system at the first time point; and a second acquisition unit configured to acquire the second identification information assigned to the second file to be backed up to the file system at a second time point subsequent to the first time point. If the determination unit determines that the first identification information and the second identification information match each other, the control unit may perform such control that the second file is prevented from being copied to the file system at the second time point and that the second identification information is included in second management information and associated with the first file, the second management information for managing each file backed up at the second time point. In that case, the present invention may further comprise: a first registration unit configured to register, in count information, an increase in the number of pieces of identification information associated with the first file, when the second identification information becomes associated with the first file, the count information indicating the number of pieces of identification information associated with the first file; a second registration unit configured to register, in the count information, a decrease in the number of pieces of identification information associated with the first file, in response to an instruction to delete the first management information; and a deletion unit configured to delete the first management information in response to the instruction to delete the first management information, and to also delete the first file if the count information after the registration by the second registration unit indicates that no identification information is associated with the first file.

Further, the acquisition unit may include: a first acquisition unit configured to acquire the first identification information assigned to the first file stored in a server computer, from first management information for managing each file stored in the server computer; and a second acquisition unit configured to acquire the second identification information assigned to the second file stored in a client computer, from second management information for managing each file stored in the client computer. The control unit may perform such control that the second file is deleted from the client computer, if the determination unit determines that the first identification information and the second identification information match each other.

Furthermore, the acquisition unit may include: first acquisition unit configured to acquire the first identification information assigned to the first file stored in a server computer, from management information for managing each file stored in the server computer; and a second acquisition unit configured to acquire the second identification information from data in an electronic mail received by a client computer, the second identification information being assigned to the second file attached to the electronic mail, and the control unit performs such control that the second file is prevented from being saved in the client computer, if the determination unit determines that the first identification information and the second identification information match each other.

Additional embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Herein below, embodiments of the present invention will be described in detail by referring to the accompanying drawings.

First of all, as a premise of the following embodiment of the present invention, a preexisting UNIX (registered trademark)-based file system program will be described. A term "file system" here may cause some complications as it can indicate both a system program for managing files and a file group existing on a given storage. Thus, in the following, the former will be referred to as a "file system program."

The preexisting file system program has secured an area called an inode area on an apparatus forming a file system. In this area, there exist multiple but finite number of data structures called inodes. Each inode holds the following information (inode information):

a device ID (information for identifying a device in which a file is stored)

an inode number for identifying the file in the file system a time stamp group indicating the last inode update time (ctime), the last file update time (mtime), and the last reference time (atime)

the length of the file a user ID of an owner of the file a group ID and a file permission of the file the type of the file (file/directory, etc.)

a reference count indicating the number of hard links referring to the inode.

Here, each directory serving as a main component of a tree structure is a file having a special attribute with which the file name and inode number of a file under the directory is held as paired information. The attribute allows the directory to hold multiple sets of such paired information in a list. When given a path name, the file system program searches the file system starting from the root directory and locates the file of interest on the basis of the file name and the inode number. Note that in the preexisting file system program, a file obtained by copying an already-backed-up file has the same last file update time as that of the already-backed-up file but the inode number is different, and therefore the file is backed up duplicately.

Figure 1:
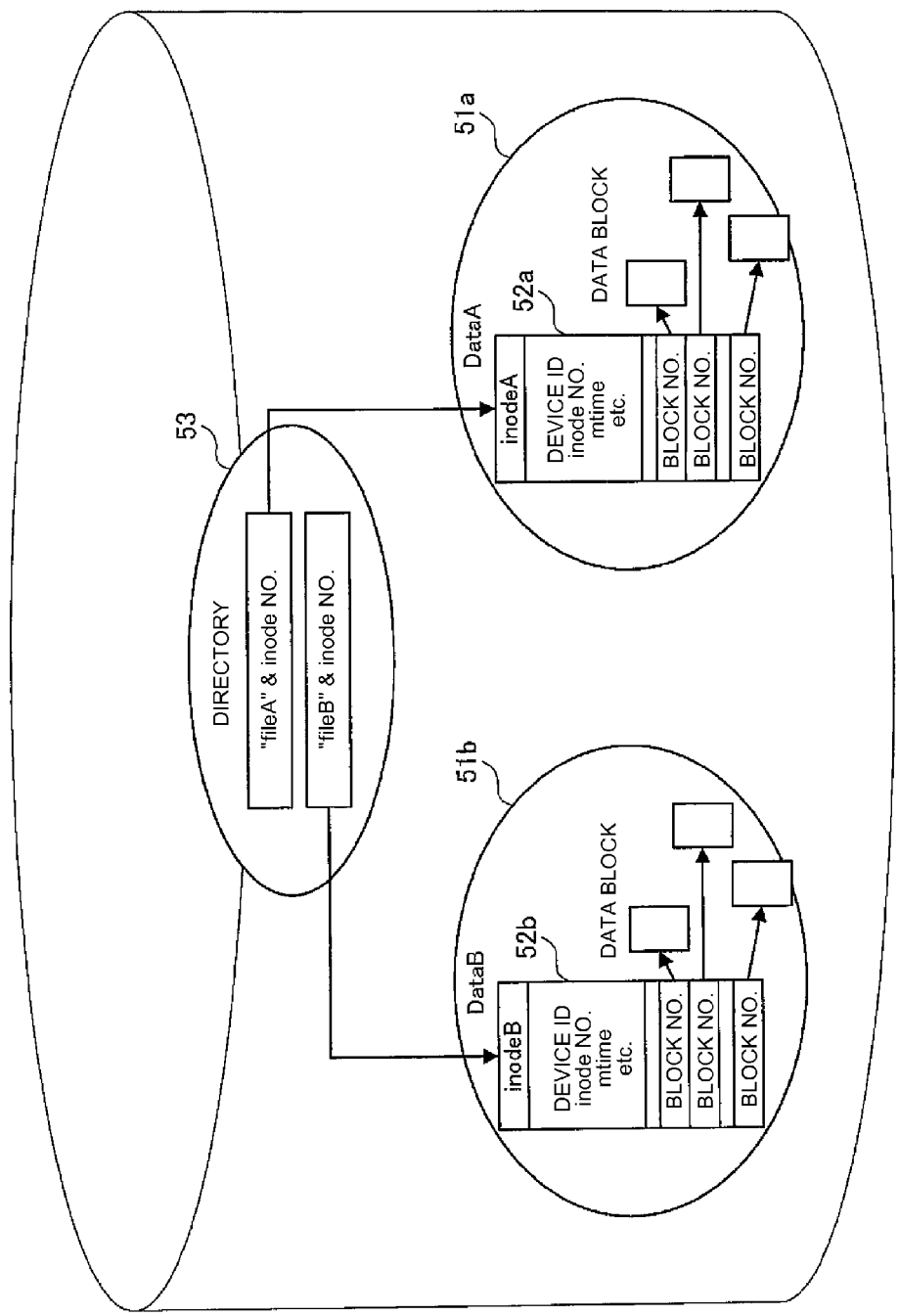
FIG. 1 is a diagram showing an example of a preexisting file system.

FIG. 1 is a diagram showing a preexisting file system managed by the preexisting file system program. In the diagram, the preexisting file system stores a file 51a and a file 51b therein. Here, the entity of the data in the file 51a is denoted as "DataA" while the entity of the data in the file 51b is denoted as "DataB." Moreover, the preexisting file system stores therein inode information 52a including block numbers indicating the locations of data blocks forming the file 51a, and the like, as well as inode information 52b including block numbers indicating the locations of data blocks forming the file 51b, and the like.

Further, the preexisting file system stores a directory 53 therein. The directory 53 stores therein the file name of the file 51a "fileA" in association with the inode number in the inode information 52a, and the file 51a is reachable from the directory 53 through the inode information 52a by use of the inode number. The directory 53 also stores therein the file name of the file 51b "fileB" in association with the inode number in the inode information 52b, and the file 51b is reachable from the directory 53 through the inode information 52b by use of the inode number.

Meanwhile, this embodiment proposes an extended file system program that allows easy deduplication in not only backup applications but also general applications. In this case, the deduplication can be achieved by the two following methods, i.e., "the assignment of a unique ID for each file entity" and "the extension of the directory structure for application use."

[Assignment of Unique ID for Each File Entity]

Theoretically, the system is able to recognize that a given file has remained unchanged for a certain period of time and that a given file is a copy of some other file. Hence, the system should be able to avoid data duplication as mentioned above. There is, however, a problem in the preexisting file system program which makes such avoidance difficult. Specifically, the aforementioned inode information is merely information that only indicates where a file exists on the storage device. That is, whether files are the same or not cannot be determined solely by the inode information. While it is possible to determine that two files do not match each other on the basis of the lengths and types of the files, it is necessary to entirely compare the entities of the files with each other in order to determine whether they are the same or not.

In this regard, this embodiment proposes the assignment of a unique ID for each file at the time of creating or updating the file. This ID is a storage wide, unique ID managed by the file system program. This ID will be hereinafter referred to as WWUID (World Wide Unique ID). The extended file system program and backup application in this embodiment manage the data entity by using this WWUID, and also move the WWUID along with the copying and moving of the data entity. By this, the storage system can recognize that the data has already been backed up (copied) without having to perform comparison of the whole data.

Here, whether the above technique is implementable or not depends on whether the size of the WWUID falls within an adequate range. As described below, around 128 bits (16 bytes) is large enough as the size of the WWUID, which we assume is about 0.006% of a single file. Now, assume that the whole data amount in the file system is 1 exabytes ($2^{60}$ bytes). This is a size far larger than the sizes of existing storage devices. Assume also that the average file size is 256 KB ($2^{18}$ bytes). This is slightly smaller than the average file sizes in general PCs.

When the above conditions are assumed, 128 bits, which is the size of the WWUID, is equal to 0.0061% of a single file ($=2^4$ bytes/$2^{18}$ bytes). Moreover, while the average number of files in the file system is $2^{42}$, $2^{128}$ files can be expressed with 128 bits, which is the size of the WWUID. Thus, the IDs will not be exhausted even when all the files are updated $2^{128-42}$ times. Accordingly, around 128 bits is considered large enough for the WWUID.

Figure 2:
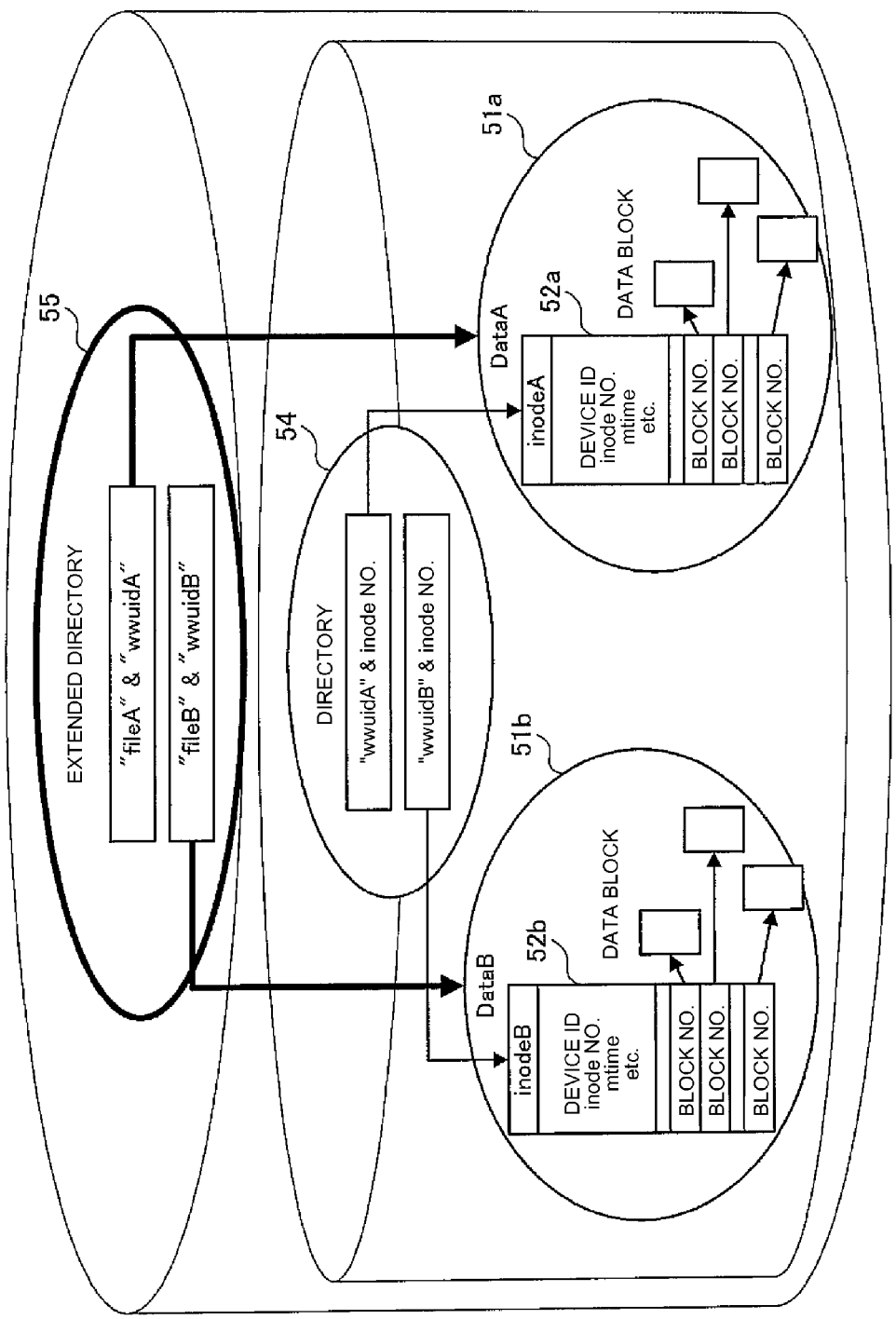
FIG. 2 is a diagram showing an example of a file system in an embodiment of the present invention.

FIG. 2 is a diagram showing an example of implementation of an extended file system managed by the extended file system program.

In the diagram, the extended file system stores a file 51a and a file 51b therein. Here, the entity of the data in the file 51a is denoted as "DataA" while the entity of the data in the file 51b is denoted as "DataB." Moreover, the extended file system stores therein inode information 52a including block numbers indicating the locations of data blocks forming the file 51a, and the like, as well as inode information 52b including block numbers indicating the locations of data blocks forming the file 51b, and the like.

Further, the extended file system stores a directory 54 therein. Instead of the file name of the file 51a "fileA," the directory 54 stores therein the WWUID of the file 51a "wwuidA" in association with the inode number in the inode information 52a, and the file 51a is reachable from the directory 54 by use of the inode number in the inode information 52a. Moreover, instead of the file name of the file 51b "fileB," the directory 54 stores therein the WWUID of the file 51b "wwuidB" in association with the inode number in the inode information 52b, and the file 51b is reachable from the directory 54 by use of the inode number in the inode information 52b.

Furthermore, the extended file system stores an extended directory 55 therein. The extended directory 55 stores therein the file name of the file 51a "fileA" in association with the WWUID of the file 51a "wwuidA." The inode number associated with the WWUID "wwuidA" may be acquired by referring to the directory 54, and the file 51a may be reached from the extended directory 55 through the inode information 52a by use of the inode number. The directory 55 also stores therein the file name of the file 51b "fileB" in association with the WWUID of the file 51b "wwuidB." The inode number associated with the WWUID "wwuidB" may be acquired by referring to the directory 54, and the file 51b may be reached from the extended directory 55 through the inode information 52b by use of the inode number.

From the extended directory 55, the files 51a and 51b are reachable through the directory 54 as described above. Note, however, that the diagram uses simplified illustration in which the WWUIDs in the extended directory 55 directly point the files 51*a* and 51*b* as shown by bold arrows. Such simplified illustration will be used in the following description as well.

[Extension of Directory Structure for Application Use]

In the preexisting file system, only data whose file type is directory is allowed to have a pointer to a file entity. In this embodiment, in contrast, WWUIDs are used to permit application data to utilize the tree structure (directory structure) of the file system. Meanwhile, there are preexisting applications such as one for processing a document with a review comment in DTP (DeskTop Publishing) and one for sending and receiving an electronic mail with an attachment file. Such preexisting applications use their own unique schemes to include a data stream such as the original document to which the review comment is to be attached, or the attachment file. For this reason, when there are multiple files containing the same data stream, the application is the only one that can recognize such a fact. To solve this, this embodiment allows application data to include a file in the same way as data of the extended directory. This facilitates the deduplication of the same file that is included by application data of different types. In addition, the data of the extended directory and the application data share each WWUID's reference count (hereinafter, also referred to as "Rcnt"). This allows the application to handle whether or not the file entity is deleted, in the same way as the extended file system program.

Figure 3:
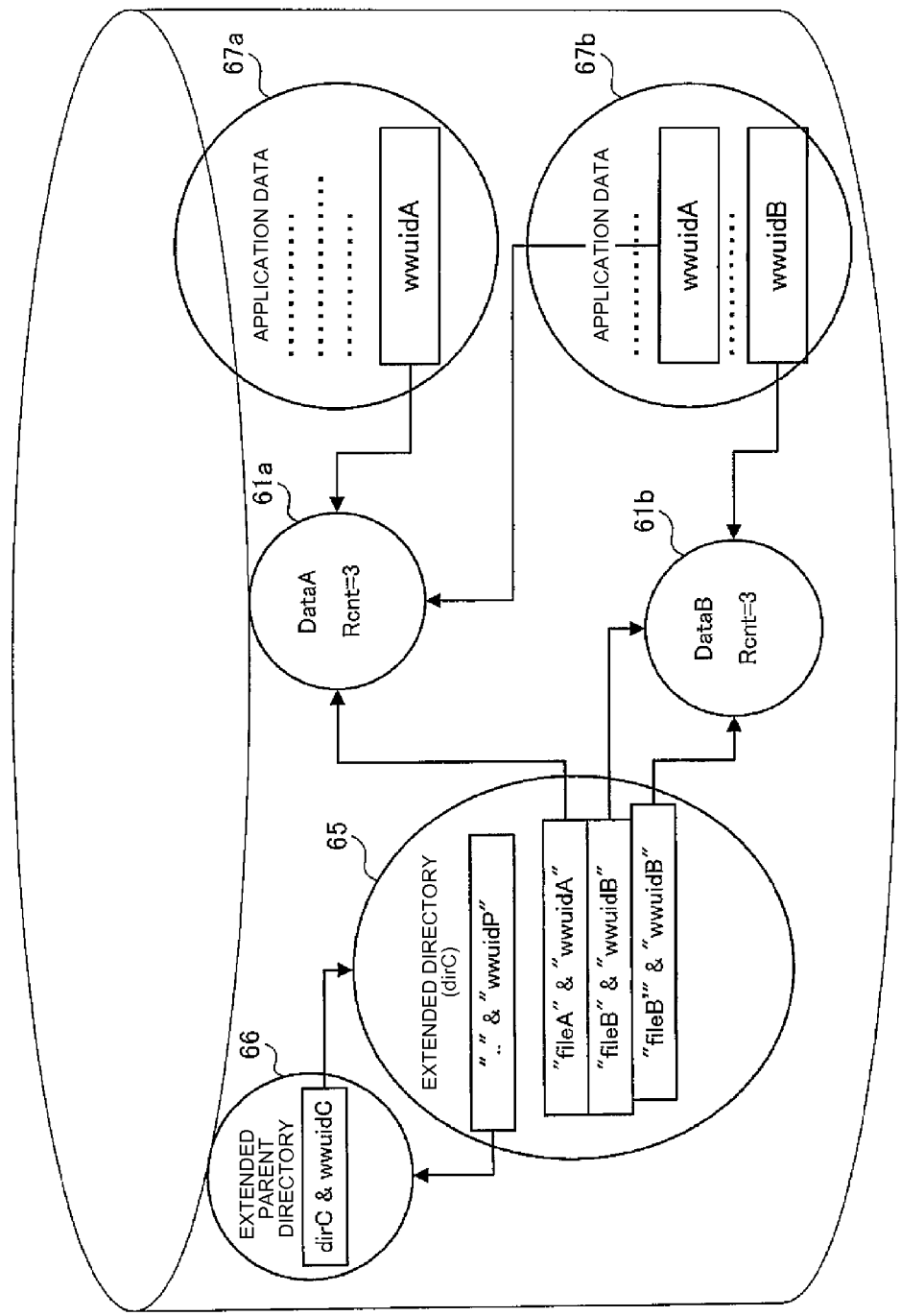
FIG. 3 is a diagram showing integration of application data and extended directory in the embodiment of the present invention.

FIG. 3 is a diagram schematically showing integration of application data and extended directory as mentioned above. In the diagram, the extended file system stores a file 61*a* and a file 61*b* therein. Here, the entity of the data in the file 61*a* is denoted as "DataA" while the entity of the data in the file 61*b* is denoted as "DataB." Moreover, the extended file system stores an extended directory 65 therein. The extended directory 65 stores therein the file name of the file 61*a* "fileA" in association with the WWUID of the file 61*a* "wwuidA", and the file 61*a* is reachable from the extended directory 65 by use of the WWUID "wwuidA." The extended directory 65 also stores therein the file name of the file 61*b* "fileB" in association with the WWUID of the file 61*b* "wwuidB," and the file 61*b* is reachable from the extended directory 65 by use of the WWUID "wwuidB." Further, the extended directory 65 stores therein "fileB'" as the file name of some other file having the same content as the file 61*b* in association with the WWUID of the file 61*b* "wwuidB," and the file 61*b* is reachable from the extended directory 65 by use of the WWUID "wwuidB." Here, the file name of the extended directory 65 is set to "dirC."

Furthermore, the extended file system stores therein an extended directory 66 as a parent directory (extended parent directory). The extended parent directory 66 stores therein the file name of the extended directory 65 "dirC" in association with the WWUID of the extended directory 65 "wwuidC," and the extended directory 65 is reachable from the extended parent directory 66 by use of the WWUID "wwuidC." The extended directory 65 stores therein ".." indicating the parent directory in association with the WWUID of the extended parent directory 66 "wwuidP," and the extended parent directory 66 is reachable from the extended directory 65 by use of the WWUID "wwuidP."

The extended file system also stores application data 67*a* therein. The application data 67*a* includes the WWUID of the file 61*a* "wwuidA," and the file 61*a* is reachable from the application data 67*a* by use of the WWUID "wwuidA." The extended file system further stores application data 67*b* therein. The application data 67*b* includes the WWUID of the file 61*a* "wwuidA and the WWUID of the file 61*b* "wwuidB," and the files 61*a* and 61*b* are reachable from the application data 67*b* by use of the WWUIDs "wwuidA" and "wwuidB." Note that in this example, the file 61*a* is reachable by use of one WWUID in each of the extended directory 65, the application data 67*a*, and the application data 67*b*, and therefore the Rcnt in inode information associated with the file 61*a* is "3." Moreover, the file 61*b* is reachable by use of two WWUIDs in the extended directory 65 and one WWUID in the application data 67*b*, and therefore the Rcnt in inode information associated with the file 61*b* is "3."

[File Management Apparatus]

Next, a file management apparatus 10 implemented by the aforementioned extended file system program will be described specifically. Note that the description will be given while assuming the implementation example shown in FIG. 2.

Figure 4:
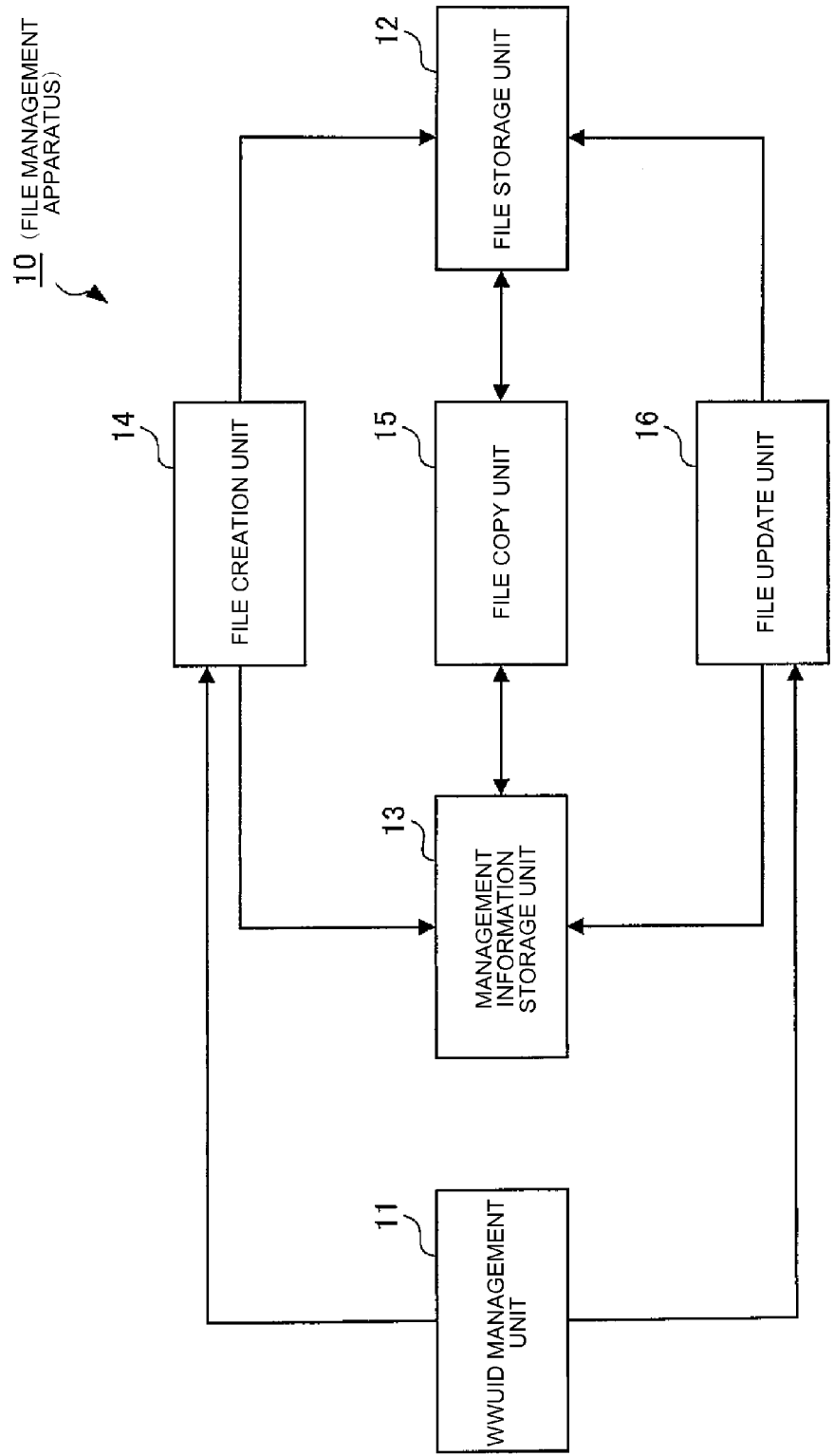
FIG. 4 is a block diagram showing an example of the functional configuration of a file management apparatus in the embodiment of the present invention.

FIG. 4 is a diagram showing an example of the functional configuration of the file management apparatus 10. As shown in the diagram, the file management apparatus 10 includes a WWUID management unit 11, a file storage unit 12, a management information storage unit 13, a file creation unit 14, a file copy unit 15, and a file update unit 16.

The WWUID management unit 11 is configured to manage $2^{128}$ WWUIDs mentioned above together with usage information on the WWUIDs. In this embodiment, each WWUID is used as an example of identification information which is newly assigned to a file upon creation or update of the file and is inherited by the file from a different file if the file is a copy of the different file, to thereby make a content of the file identifiable.

The file storage unit 12 is configured to store files therein. The management information storage unit 13 is configured to store therein inode information, directories, and extended directories. The file creation unit 14 is configured to, in response to a file creation instruction specifying a directory and a file name from a user or application, create a new file with the specified file name under the specified directory. In this event, the file creation unit 14 assigns an unused WWUID to the new file. In this embodiment, the file creation unit 14 is provided as an example of a first assignment unit configured to assign the identification information to a new file.

The file copy unit 15 is configured to, in response to a file copy instruction specifying a copy source directory, a copy destination directory, and a file name from the user or application, copy a file (copy source file) of the specified name under the specified copy source directory to thereby create a file (copy destination file) with the same file name under the specified copy destination directory. In this event, the file copy unit 15 makes the copy destination file take over the WWUID assigned to the copy source file. In this embodiment, the file copy unit 15 is provided as an example of a second assignment unit configured to assign the same, original identification information to a copied file.

The file update unit 16 is configured to, in response to a file update instruction specifying a directory and a file name from the user or application, update a file of the specified file name under the specified directory. In this event, the file update unit 16 assigns an unused WWUID to the updated file. In this embodiment, the file update unit 16 is provided as an example of a third assignment unit configured to assign different identification information to an updated file.

Figure 5:
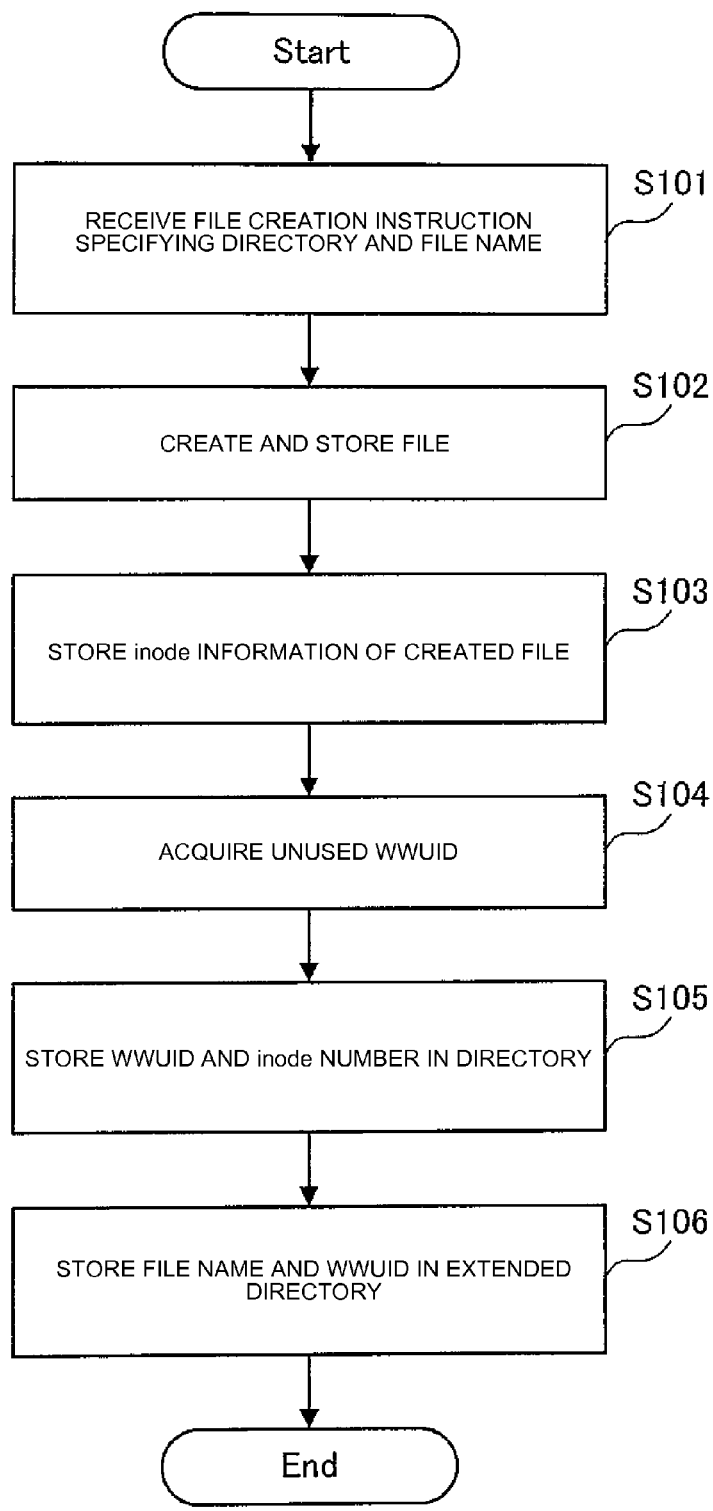
FIG. 5 is a flowchart showing an example of operations of the file management apparatus in creating a file in the embodiment of the present invention.

Next, operations of the file management apparatus 10 will be described. FIG. 5 shows operations of the file creation unit 14 in creating a file. The file creation unit 14 first receives a file creation instruction specifying a directory and a file name (step 101). In response to this, the file creation unit 14 creates a new file and stores it in the file storage unit 12 (step 102) and then stores the inode information of the file in the management information storage unit 13 (step 103). Thereafter, the file creation unit 14 acquires an unused WWUID from the WWUID management unit 11 (step 104). The file creation unit 14 then adds the association of the WWUID acquired in step 104 with the inode number in the inode information stored in step 103 to a directory stored in the management information storage unit 13 (step 105). In addition, the file creation unit 14 adds the association of the file name specified in step 101 with the WWUID acquired in step 104 to an extended directory stored in the management information storage unit 13 (step 106).

Figure 6:
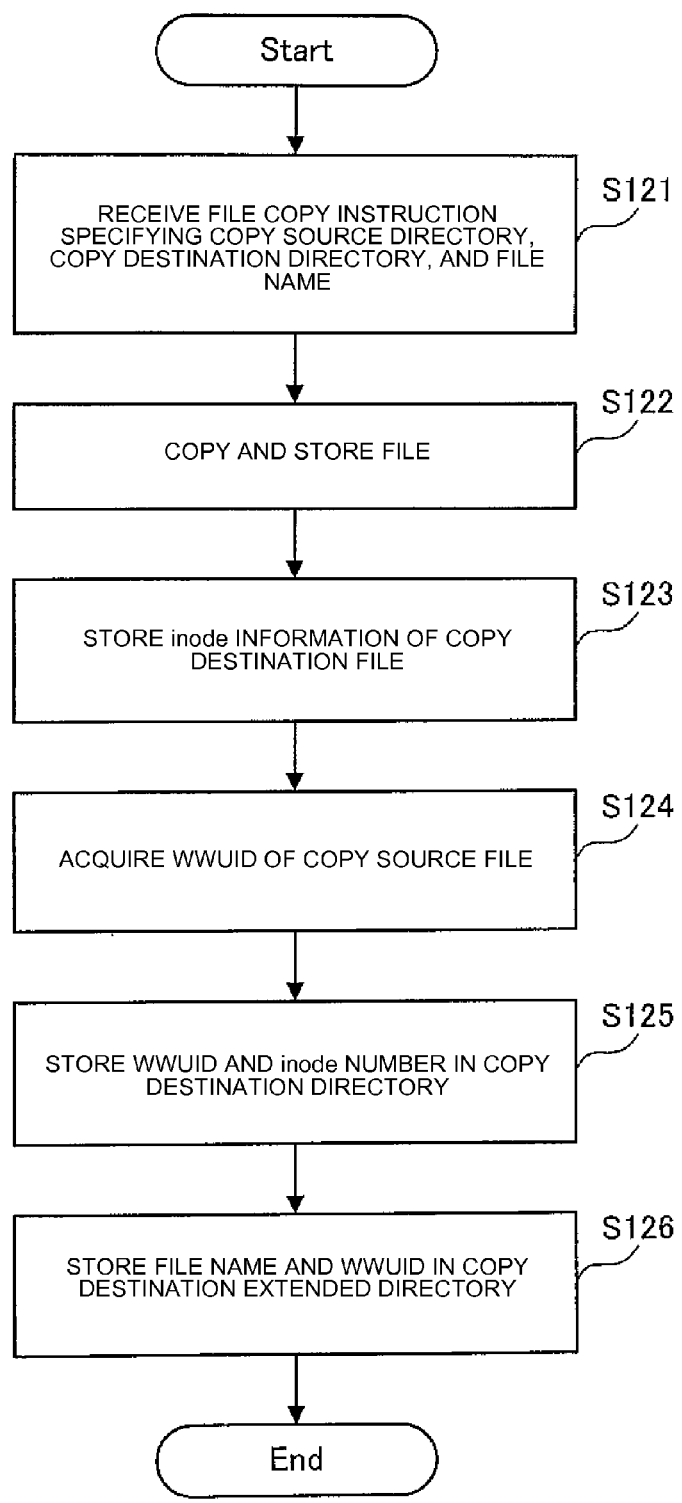
FIG. 6 is a flowchart showing an example of operations of the file management apparatus in copying a file in the embodiment of the present invention.

FIG. 6 shows operations of the file copy unit 15 in copying a file. The file copy unit 15 first receives a file copy instruction specifying a copy source directory, a copy destination directory, and a file name (step 121). In response to this, the file copy unit 15 reads, from the file storage unit 12, a copy source file of the specified name under the specified copy source directory, copies the copy source file to obtain a copy destination file, and stores the copy destination file in the file storage unit 12 as a file of the same file name under the copy destination directory (step 122). Thereafter, the file copy unit 15 stores the inode information of the copy destination file in the management information storage unit 13 (step 123).

Subsequently, the file copy unit 15 searches, by the file name specified in step 121, an extended directory corresponding to the copy source directory stored in the management information unit 13, and acquires the WWUID of the copy source file (step 124). The file copy unit 15 then adds the association of the WWUID acquired in step 124 with the inode number in the inode information stored in step 123 to the copy destination directory stored in the management information storage unit 13 (step 125). In addition, the file copy unit 15 adds the association of the file name specified in step 121 with the WWUID acquired in step 124 to an extended directory corresponding to the copy destination directory stored in the management information storage unit 13 (step 126).

Figure 7:
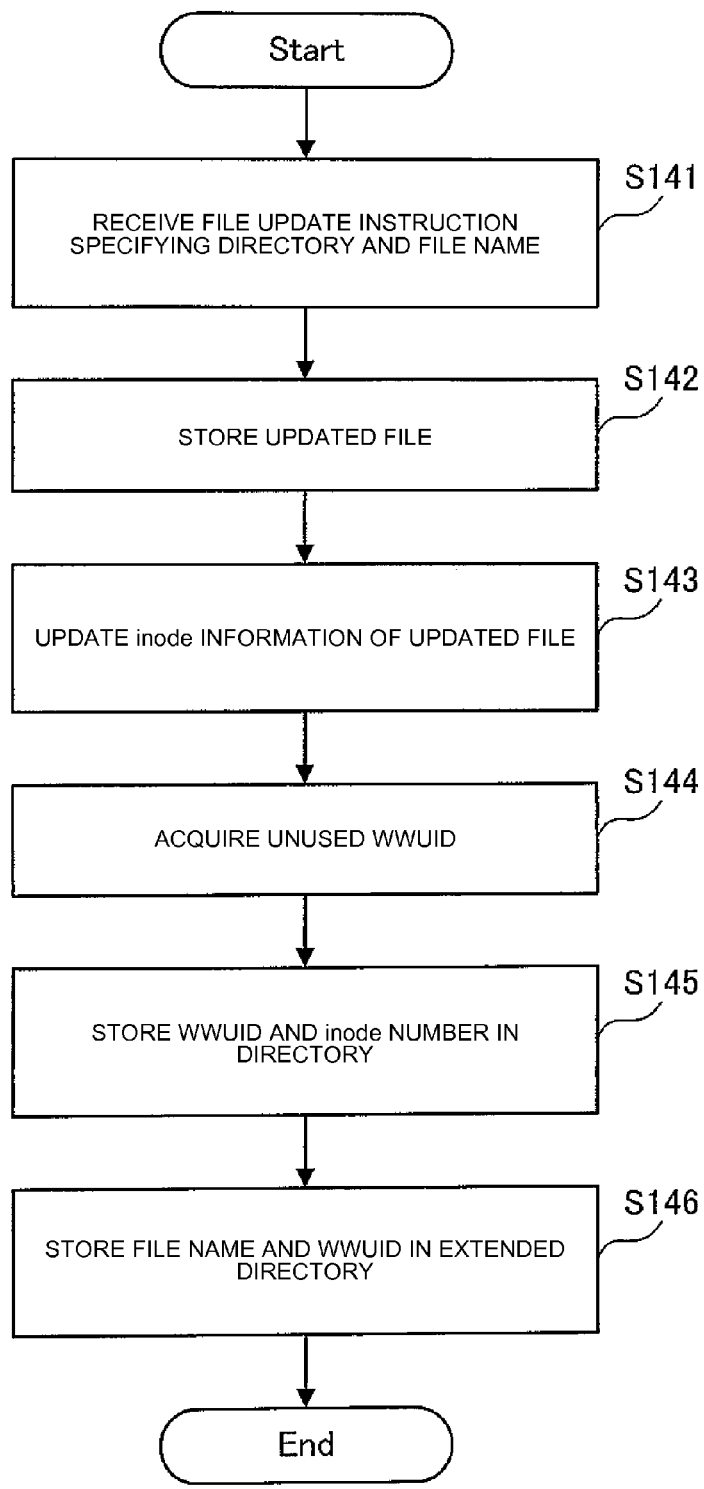
FIG. 7 is a flowchart showing an example of operations of the file management apparatus in updating a file in the embodiment of the present invention.

FIG. 7 shows operations of the file update unit 16 in updating a file. The file update unit 16 first receives a file update instruction specifying a directory and a file name (step 141). In response to this, the file update unit 16 stores, in the file storage unit 12, a file obtained by updating a file of the specified name under the specified directory (step 142), and updates the file's inode information (the last update time, etc.) stored in the management information storage unit 13 (step 143). Thereafter, the file update unit 16 acquires an unused WWUID from the WWUID management unit 11 (step 144). The file update unit 16 then replaces the association between the WWUID and inode number of the pre-update file included in the directory stored in the management information storage unit 13, with the association between the WWUID acquired in step 144 and the same inode number (step 145). In addition, the file update unit 16 replaces the association between the file name and WWUID of the pre-update file included in an extended directory stored in the management information storage unit 13, with the association between the same file name and the WWUID acquired in step 144 (step 146).

[File Deduplication]

The following provides some scenarios for file deduplication in this embodiment.

[Deduplication in Periodical Full Backup]

Figure 8:
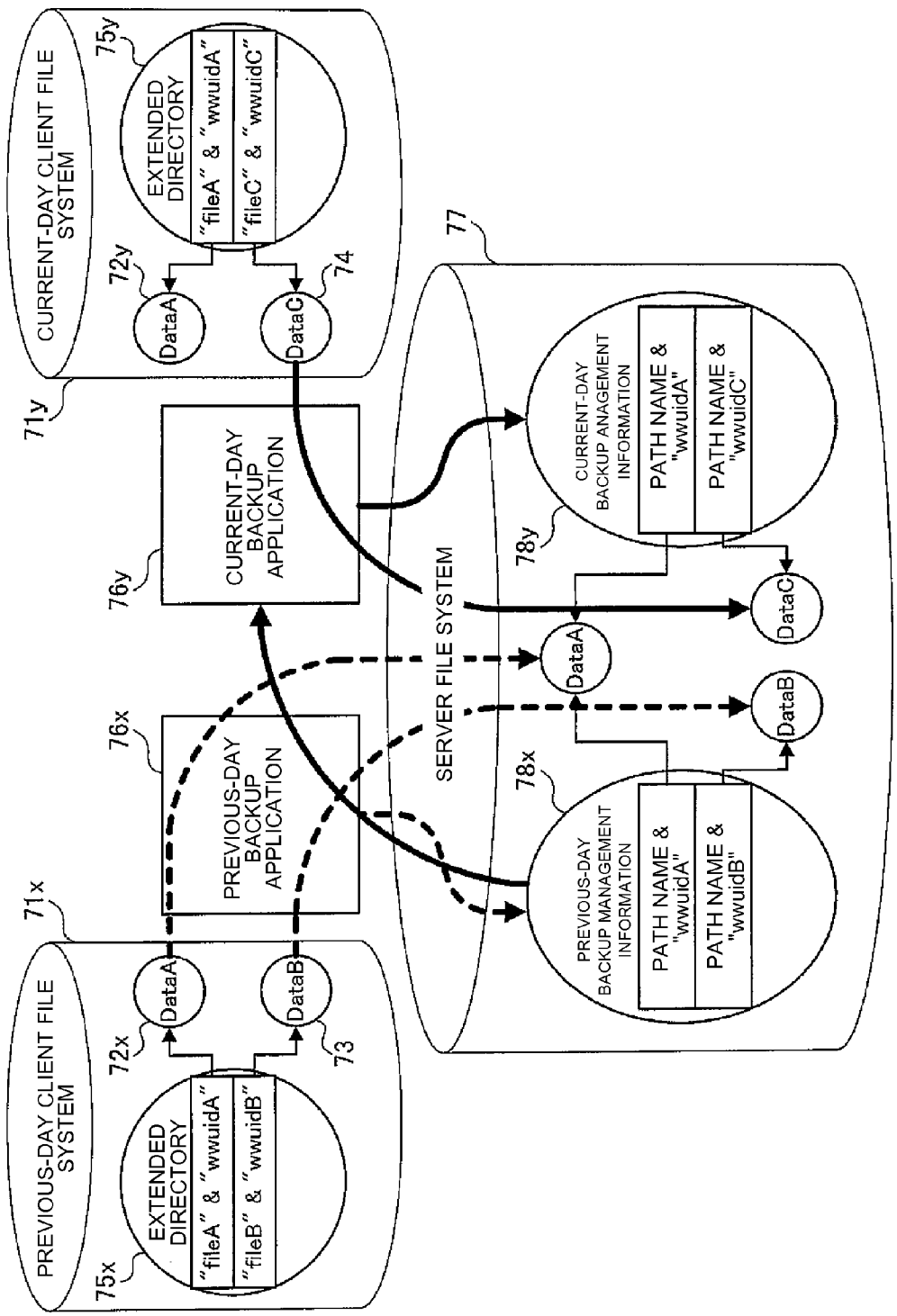
FIG. 8 is a diagram showing elimination of duplication between a backup file of the current day and a backup file of the previous day in the embodiment of the present invention.

FIG. 8 shows an example where a D-to-D (Disk to Disk) backup application (hereinafter, simply referred to as "backup application") eliminates duplication by comparing a backup of the current day and a backup of the previous day.

Backup operations of the previous day will be described first. A client file system 71x of the previous day (hereinafter, referred to as "previous-day client file system 71x") stores a file 72x and a file 73 therein. Here, the entity of the data in the file 72x is denoted as "DataA" while the entity of the data in the file 73 is denoted as "DataB."

The previous-day client file system 71x also stores an extended directory 75x therein. The extended directory 75x stores therein the file name of the file 72x "fileA" in association with the WWUID of the file 72x "wwuidA," and the file 72x is reachable from the extended directory 75x by use of the WWUID "wwuidA." The extended directory 75x also stores therein the file name of the file 73 "fileB" in association with the WWUID of the file 73 "wwuidB," and the file 73 is reachable from the extended directory 75x by use of the WWUID "wwuidB."

A backup application 76x that has operated on the previous day (hereinafter, referred to as "previous-day backup application 76x") copies the file 72x and the file 73 from the previous-day client file system 71x to a server file system 77 as indicated by bold dotted arrows. In this event, the previous-day backup application 76x also creates backup management information 78x of the previous day (hereinafter, referred to as "previous-day backup management information 78x") within the server file system 77 as indicated by a similar bold dotted arrow. The previous-day backup management information 78x indicates a list of previous-day backup files and has a data structure similar to the data structure of the extended directory.

Backup operations of the current day will be described next. A client file system 71y of the current day (hereinafter, referred to as "current-day client file system 71y") stores a file 72y and a file 74 therein. Here, the entity of the data in the file 72y is denoted as "DataA" while the entity of the data in the file 74 is denoted as "DataC." The current-day client file system 71y also stores an extended directory 75y therein. The extended directory 75y stores therein the file name of the file 72y "fileA" in association with the WWUID of the file 72y "wwuidA," and the file 72y is reachable from the extended directory 75y by use of the WWUID "wwuidA." The extended directory 75y also stores therein the file name of the file 74 "fileC" in association with the WWUID of the file 74 "wwuidC," and the file 74 is reachable from the extended directory 75y by use of the WWUID "wwuidC."

As indicated by bold solid arrows, a backup application 76y that operates on the current day (hereinafter, referred to as "current-day backup application 76y") refers to the previous-day backup management information 78x and locates the file 72y that does not need to be copied to the server file system 77, without comparing the file entities, and copies only the file 74 that needs to be copied to the server file system 77. Finally, the current-day backup application 76y stores backup management information 78y of the current day (hereinafter, referred to as "current-day backup management information 78y") as indicated by a similar bold solid arrow. Note that the current-day backup management information 78y indicates a list of current-day backup files and has a data structure similar to the data structure of the extended directory. What is important here is that the backup files managed by the previous-day backup management information 78x and the backup files managed by the current-day backup management information 78y are restorable independently.

Note that in FIG. 8, the current day and the previous day are shown as exemplary two time points for comparing backups. Any two time points can be employed as long as the two time points include a first time point and a second time point that is subsequent to the first time point.

[Deduplication in Backup from Multiple Systems]

In a case of backup from multiple clients too, whether a given file entity has already been copied or not can be determined by referring to backup management information as in the case of the periodical full backup. Here, example of the multiple clients include a client used by a user X (hereinafter, referred to as "user-X client") and a client used by a user Y (hereinafter, referred to as "user-Y client") are available.

Figure 9:
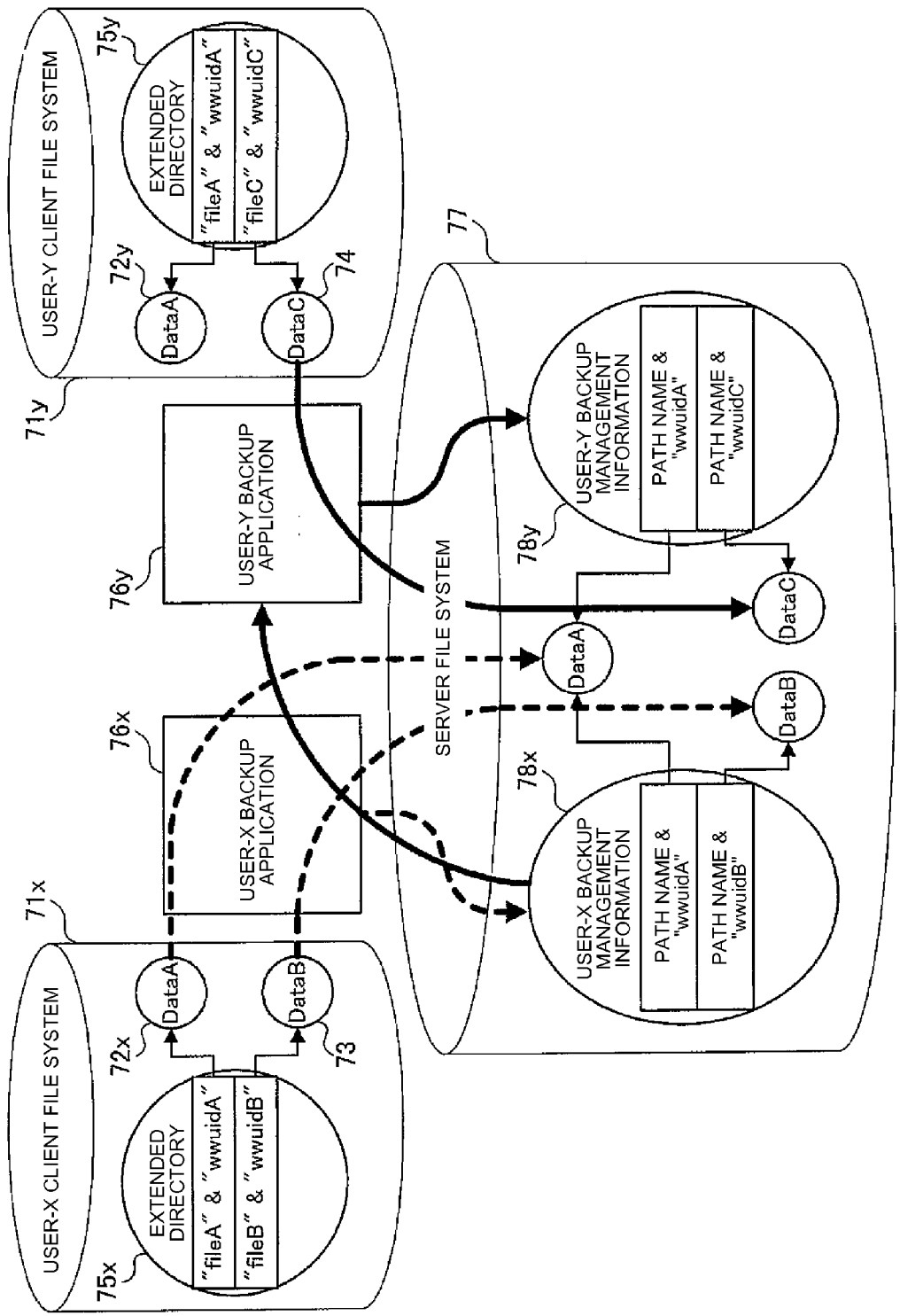
FIG. 9 is a diagram showing elimination of duplication between backup files from multiple clients in the embodiment of the present invention.

FIG. 9 shows an example where the backup application eliminates duplication by comparing a backup from the user-X client and a backup from the user-Y client. In this example, the previous-day client file system 71x, the current-day client file system 71y, the previous-day backup application 76x, the current-day backup application 76y, the previous-day backup management information 78x, and the current-day backup management information 78y in FIG. 8 are simply replaced with a user-X client file system 71x, a user-Y client file system 71y, a user-X backup application 76x, a user-Y backup application 76y, a user-X backup management information 78x, and a user-Y backup management information 78y, respectively, and therefore detailed description thereof is omitted.

Note that in FIG. 9, a file system in the user-X client is denoted as "user-X client file system;" a file system in the user-Y client is denoted as "user-Y client file system;" a backup application performing backup from the user-X client is denoted as "user-X backup application;" a backup application performing backup from the user-Y client is denoted as "user-Y backup application;" backup management information for managing a backup from the user-X client is denoted as "user-X backup management information;" backup management information for managing a backup from the user-Y client is denoted as "user-Y backup management information." Moreover, in FIG. 9, a time point at which the backup from the user-X client is performed corresponds to the aforementioned first time point, and a time point at which the backup from the user-Y client is performed corresponds to the aforementioned second time point.

[Easy Deletion of Older-Generation Backup]

Figure 10:
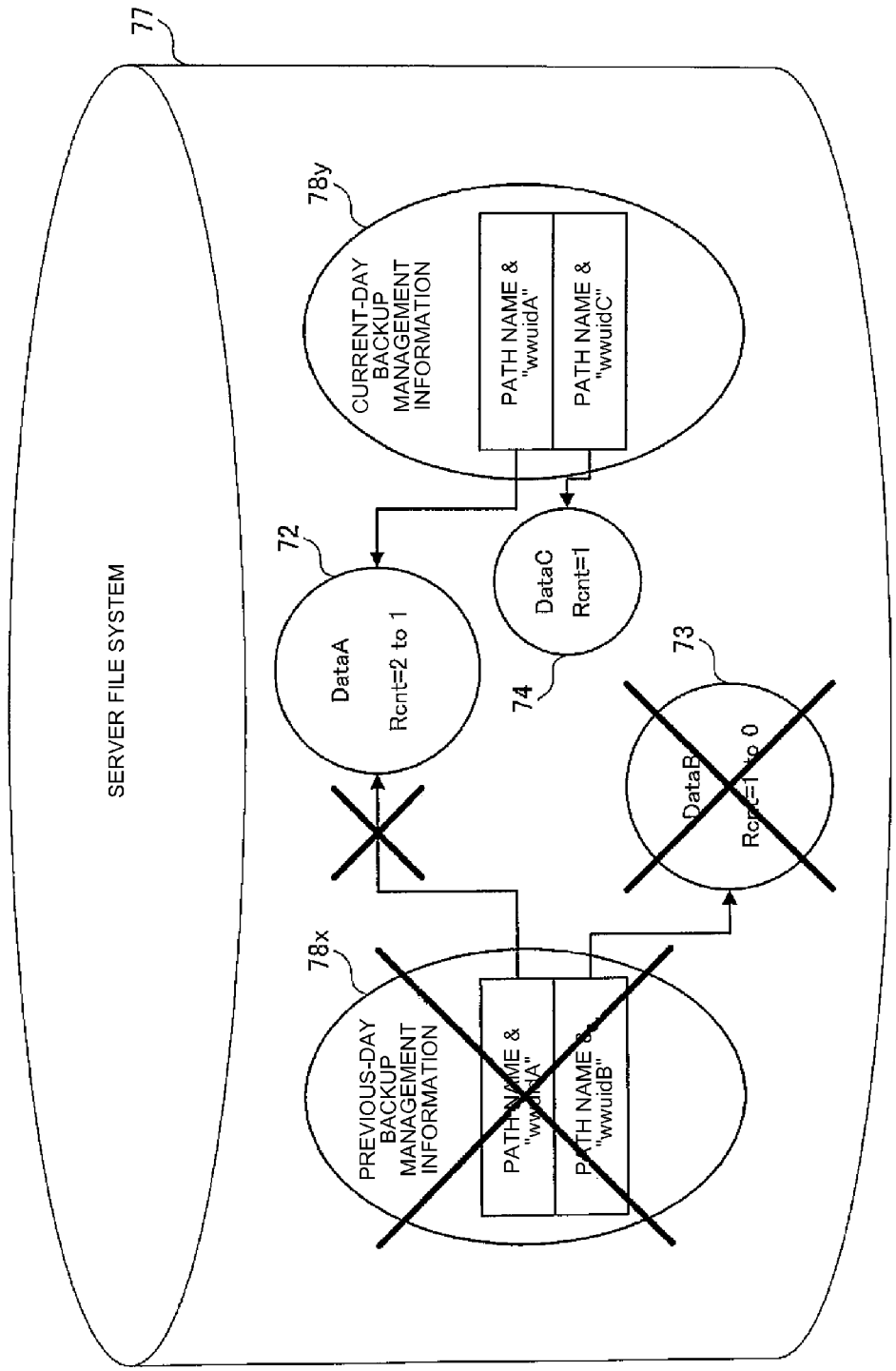
FIG. 10 is a diagram showing deletion of a backup of the previous day in the embodiment of the present invention.

FIG. 10 shows how only the previous-day backup management information 78x is deleted in a state where the previous-day backup management information 78x and the current-day backup management information 78y are present in the server file system 77. Upon deletion of the previous-day backup management information 78x, the file system program decrements the Rcnt of every related file by "1." Specifically, the Rcnt of a file 72 having a WWUID of "wwuidA" is changed from "2" to "1," and the Rcnt of a file 73 having a WWUID of "wwuidB" is changed from "1" to "0." On the other hand, the WWUID of a file 74 is not included in the previous-day backup management information 78x, and therefore the Rcnt of the file 74 is not changed. As a result of such decrement of the Rcnts, the Rcnt of the file 72 has not yet reached "0," and thus the file system program cuts the link between the file 72 and the previous-day backup management information 78x but keeps the entity of the file 72 unerased. In contrast, since the Rcnt of the file 73 has reached "0," the file system program erases the file 73.

What is important here is that a backup of a newer generation can maintain its consistency with backups of older generations even if these older-generation backups are deleted sequentially. Note that this example of the deletion of an older-generation backup is applicable not only to the case of performing the periodical full backup shown in FIG. 8 but also to the case of performing the backup from multiple clients shown in FIG. 9. In the latter case, the deletion of an older-generation backup is equivalent to the deletion of a backup from a particular client.

[Backup Apparatus]

Next, a backup apparatus 20 that performs backup and deletion of a particular backup as mentioned above will be described specifically. Note that in this section, the previous-day/user-X client file system 71x, the current-day/user-Y client file system 71y, the previous-day/user-X backup management information 78x, and the current-day/user-Y backup management information 78y will be simply referred to as client file system 71x, client file system 71y, first management information 78x, and second management information 78y, respectively. In addition, the backup apparatus 20 is assumed to be an apparatus independent of any of a computer including the client file system 71y and a computer including the server file system 77.

Figure 11:
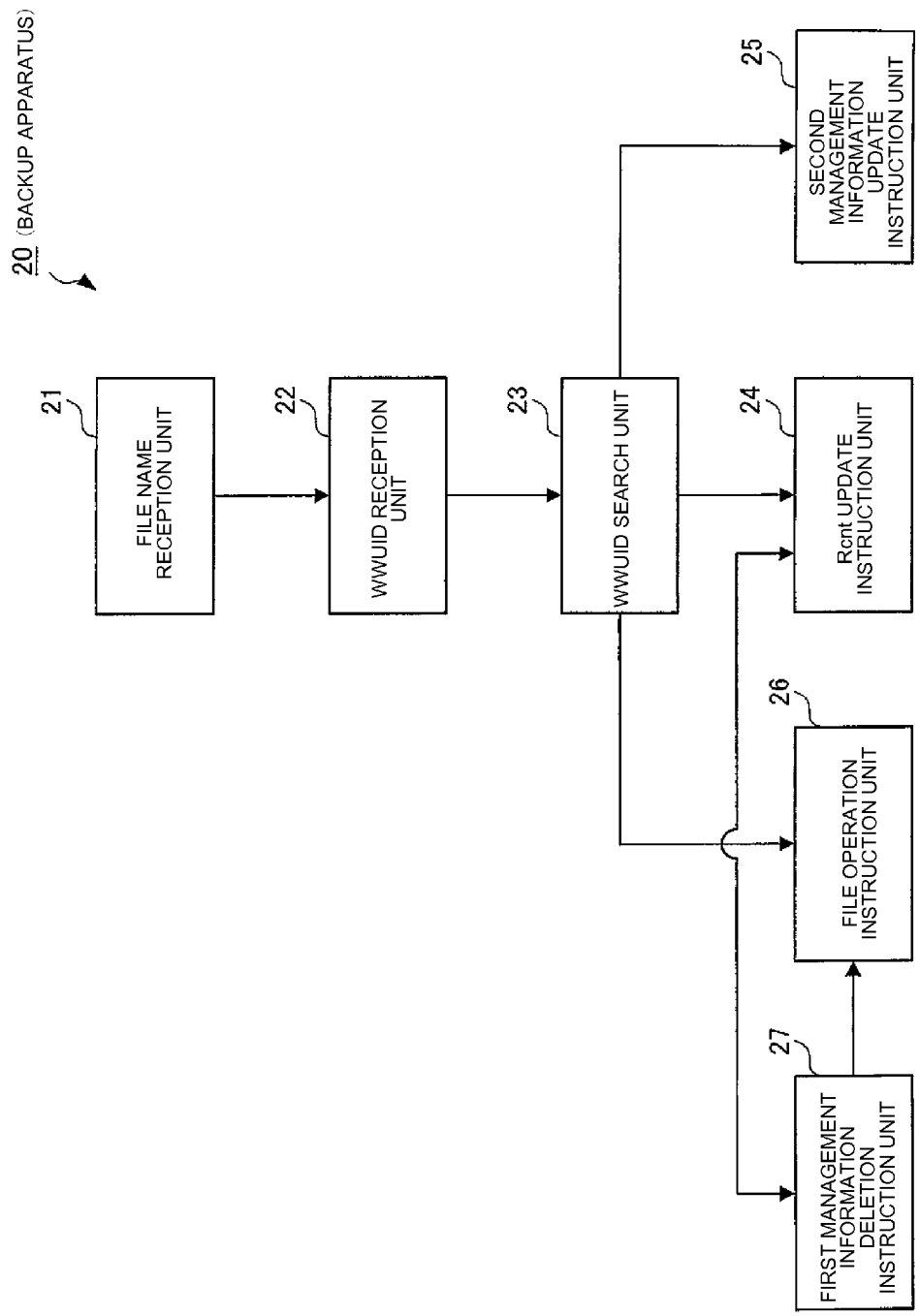
FIG. 11 is a block diagram showing an example of the functional configuration of a backup apparatus in the embodiment of the present invention.

FIG. 11 is a diagram showing an example of the functional configuration of the backup apparatus 20. As shown in the diagram, the backup apparatus 20 includes a file name reception unit 21, a WWUID reception unit 22, a WWUID search unit 23, an Rcnt update instruction unit 24, a second management information update instruction unit 25, a file operation instruction unit 26, and a first management information deletion instruction unit 27. The file name reception unit 21 configured to receive the file name of a backup target file.

The WWUID reception unit 22 configured to receive the WWUID of the backup target file from the client file system 71y. Specifically, the WWUID reception unit 22 receives a WWUID that is associated, in the extended directory 75y in the client file system 71y, with the file name received by the file name reception unit 21. In this embodiment, the backup target file is used as an example of a second file to be backed up to a file system at the second time point. The WWUID reception unit 22 is provided as an example of a second acquisition unit configured to acquire second identification information assigned to the second file. The WWUID reception unit 22 is also provided as an example of a second acquisition unit configured to acquire backup target file identification information.

The WWUID search unit 23 is configured to search the first management information 78x in the server file system 77 for the WWUID received by the WWUID reception unit 22. Specifically, the WWUID search unit 23 acquires the first management information 78x in the server file system 77, extracts the WWUID of each already-backed-up file from the first management information 78x, and determines whether the WWUID is the same as the WWUID received by the WWUID reception unit 22. In this embodiment, the already-backed-up file is used as an example of a first file backed up to the file system at the first time point. The WWUID search unit 23 is provided as an example of a first acquisition unit configured to acquire first identification information assigned to the first file. The WWUID search unit 23 is also provided as an example of a first acquisition configured to acquire first management information. The WWUID search unit 23 is further provided as an example of a determination unit configured to determine whether or not the first identification information and the second identification information match each other, and also as an example of a determination unit configured to determine whether or not the first management information includes the backup target file identification information.

The Rcnt update instruction unit 24 is configured to instruct the server file system 77 to perform an update process to increment the Rcnt in inode information corresponding to the WWUID by "1," if the WWUID search unit 23 finds the WWUID from the first management information 78x. The Rcnt update instruction unit 24 is configured to instruct the server file system 77 to perform an update process to newly store the inode information corresponding the WWUID and set "1" to the Rcnt in the inode information, if the WWUID search unit 23 fails to find the WWUID from the first management information 78x. Additionally, at the time of deleting the first management information 78x, the Rcnt update instruction unit 24 instructs the server file system 77 to perform an update process to decrement the Rcnt in the inode information corresponding to the WWUID included in the first management information 78x by "1." In this embodiment, the Rcnt is used as an example of count information indicating the number of pieces of identification information. Moreover, the Rcnt update instruction unit 24 is provided as an example of a first registration unit configured to register an increase in the number of pieces of identification information, and of a second registration unit configured to register a decrease in the number of pieces identification information.

The second management information update instruction unit 25 is configured to instruct the server file system 77 to perform an update process to add path names and WWUIDs in the first management information 78x to the second management information 78y. In this embodiment, the second management information update instruction unit 25 is provided as an example of a control unit configured to perform such control that the second identification information can be included in second management information and associated with the first file. The second management information update instruction unit 25 is also provided as an example of a storage unit configured to store the backup target file identification information into the second management information.

The file operation instruction unit 26 is configured to instruct the server file system 77 to store the backup target file therein, if the WWUID search unit 23 fails to find the aforementioned WWUID from the first management information 78x. Additionally, at the time of deleting the first management information 78x, the file operation instruction unit 26 instructs the server file system 77 to delete each file managed by the first management information 78x if conditions are not met. In this embodiment, the file operation instruction unit 26 is provided as an example of a control unit configured to perform such control that the second file can be prevented from being copied to the file system, and of a deletion unit configured to delete the first file. The file operation instruction unit 26 is also provided as an example a copy unit configured to copy the backup target file to the file system, and of a deletion unit configured to delete the already-backed-up file.

The first management information deletion instruction unit 27 is configured to instruct the server file system 77 to delete the first management information 78x. In this embodiment, the first management information deletion instruction unit 27 is provided as an example of a deletion unit configured to delete the first identification information, and of a deletion unit configured to delete the already-backed-up file identification information.

Figure 12:
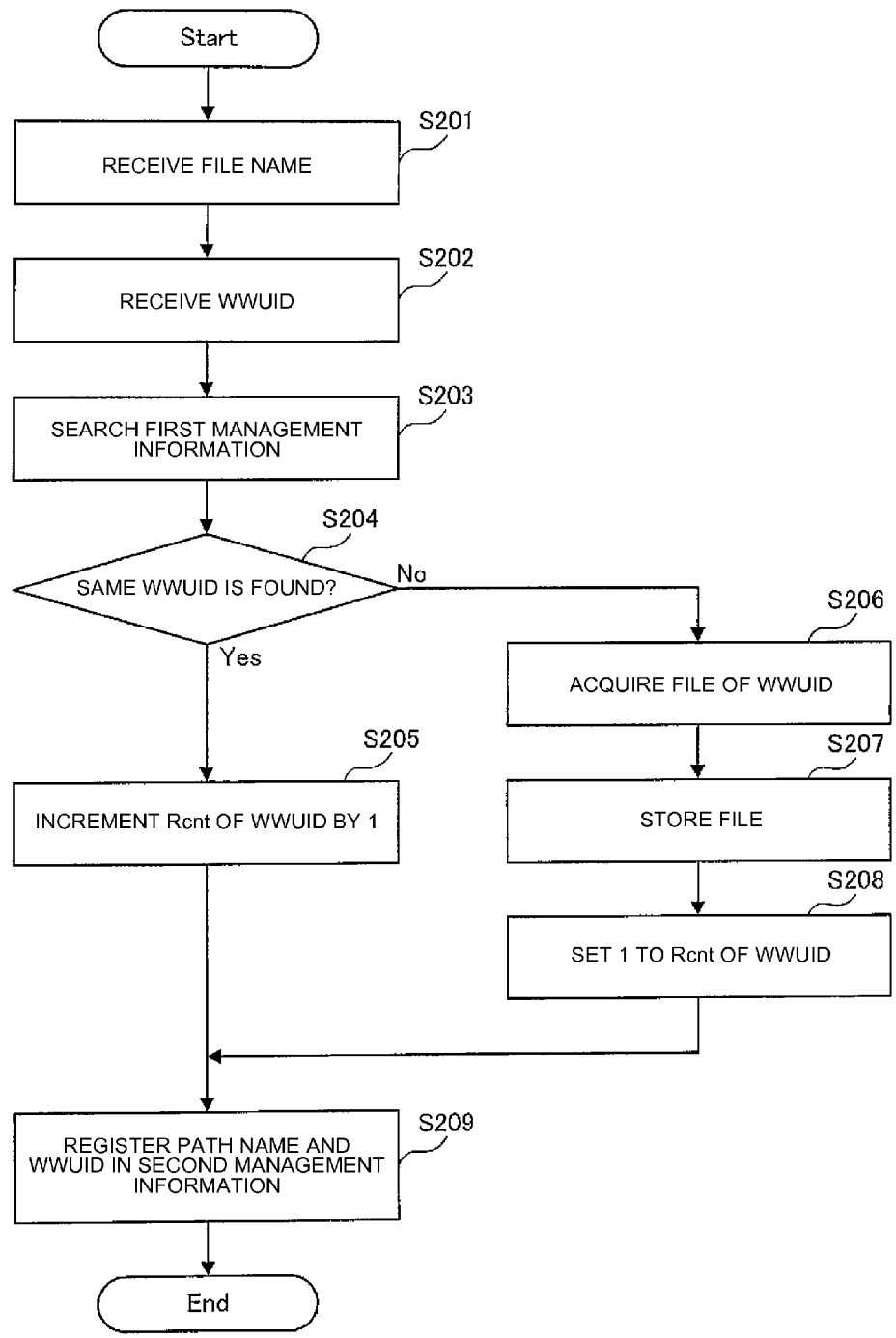
FIG. 12 is a flowchart showing an example of operations of the backup apparatus in performing backup in the embodiment of the present invention.

Next, operations of the backup apparatus 20 will be described. FIG. 12 shows operations of the backup apparatus 20 in performing backup. In the backup apparatus 20, the file name reception unit 21 first receives the file name of a backup target file (step 201). In response, the WWUID reception unit 22 receives a WWUID that is associated, in the extended directory 75y in the client file system 71y, with the file name received in step 201 (step 202).

Thereafter, the WWUID search unit 23 acquires the WWUID received by the WWUID reception unit 22 and searches the first management information 78x in the server file system 77 for the WWUID (step 203). The WWUID search unit 23 then determines whether or not the WWUID is found from the first management information 78x (step 204). If the determination result shows that the WWUID is found from the first management information 78x, the WWUID is handed over from the WWUID search unit 23 to the Rcnt update instruction unit 24. The Rcnt update instruction unit 24 in turn instructs the server file system 77 to increment the Rcnt in inode information corresponding to the WWUID by "1" (step 205). Note that in this event, the WWUID search unit 23 keeps a path name corresponding to the found WWUID.

On the other hand, if the WWUID is not found from the first management information 78x, the WWUID search unit 23 acquires the backup target file from the client file system 71y (step 206). The backup target file is then handed over from the WWUID search unit 23 to the file operation instruction unit 26. The file operation instruction unit 26 in turn instructs the server file system 77 to store the backup target file therein (step 207). The WWUID acquired from the client file system 71y and held by the WWUID search unit 23 is handed over to the Rcnt update instruction unit 24. The Rcnt update instruction unit 24 in turn instructs the server file system 77 to newly create inode information corresponding to the WWUID and set "1" to the Rcnt in the inode information (step 208). Thereafter, the path name and the WWUID are handed over from the WWUID search unit 23 to the second management information update instruction unit 25. The second management information update instruction unit 25 in turn instructs the server file system 77 to register the path name and the WWUID in the second management information 78y (step 209).

Figure 13:
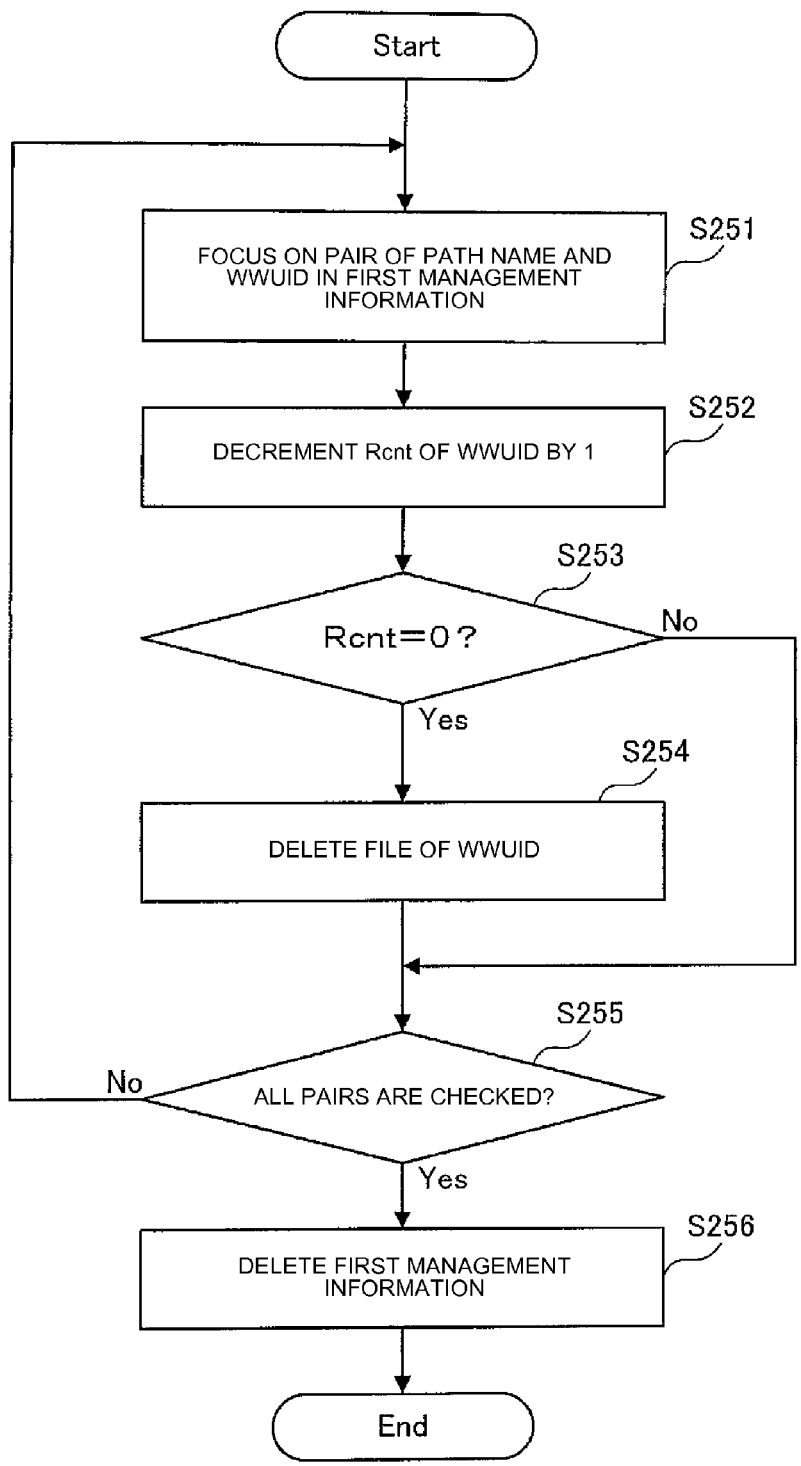
FIG. 13 is a flowchart showing an example of operations of the backup apparatus in deleting backup management information in the embodiment of the present invention.

FIG. 13 shows operations of the backup apparatus 20 in deleting the first management information 78x. In the backup apparatus 20, the first management information deletion instruction unit 27 first focuses on a pair of a path name and a WWUID in the first management information 78x (step 251). Then, the WWUID is handed over from the first management information deletion instruction unit 27 to the Rcnt update instruction unit 24. The Rcnt update instruction unit 24 in turn instructs the server file system 77 to decrement the Rcnt in inode information corresponding to the WWUID by "1" (step 252). Thereafter, the first management information deletion instruction unit 27 refers to the value of the decremented Rcnt returned from the Rcnt update instruction unit 24 and determines whether or not the Rcnt has reached "0" (step 253).

If the determination result shows that the Rcnt has reached "0," the path name of interest is handed over from the first management information deletion instruction unit 27 to the file operation instruction unit 26. The file operation instruction unit 26 in turn instructs the server file system 77 to delete the file specified by the path name (step 254). In contrast, if the Rcnt has not reached "0," this means that the file specified by the path name of interest is being referred to by the other backup management information. Hence, the file operation instruction unit 26 does not instruct the server file system 77 to delete the file. Thereafter, the first management information deletion instruction unit 27 determines whether or not all the pairs of path names and WWUIDs in the first management information 78x have been checked (step 255).

If all the pairs of path names and WWUIDs in the first management information 78x have not yet been checked, the processes in steps 251 to 254 are iterated. If all the pairs of path names and WWUIDs in the first management information 78x have been checked, the first management information deletion instruction unit 27 instructs the server file system 77 to delete the first management information 78x (step 256). Here, the backup apparatus 20 is assumed to be an apparatus independent of any of the computer including the client file system 71y and the computer including the server file system 77. Note, however, that the backup apparatus 20 may be implemented in any of these computers.

[Case Where Compression or Encryption Makes it Difficult to Determine Presence of Duplication]

In a case of a method in which file data is referred to for determining the presence of duplication, it is difficult to deduplicate data that exists in a compressed or encrypted form on a storage because the data needs to be decompressed or decrypted. This embodiment, on the other hand, uses WWUIDs to assure the coincidence between data pieces, and therefore requires no data decompression or decryption.

Figure 14:
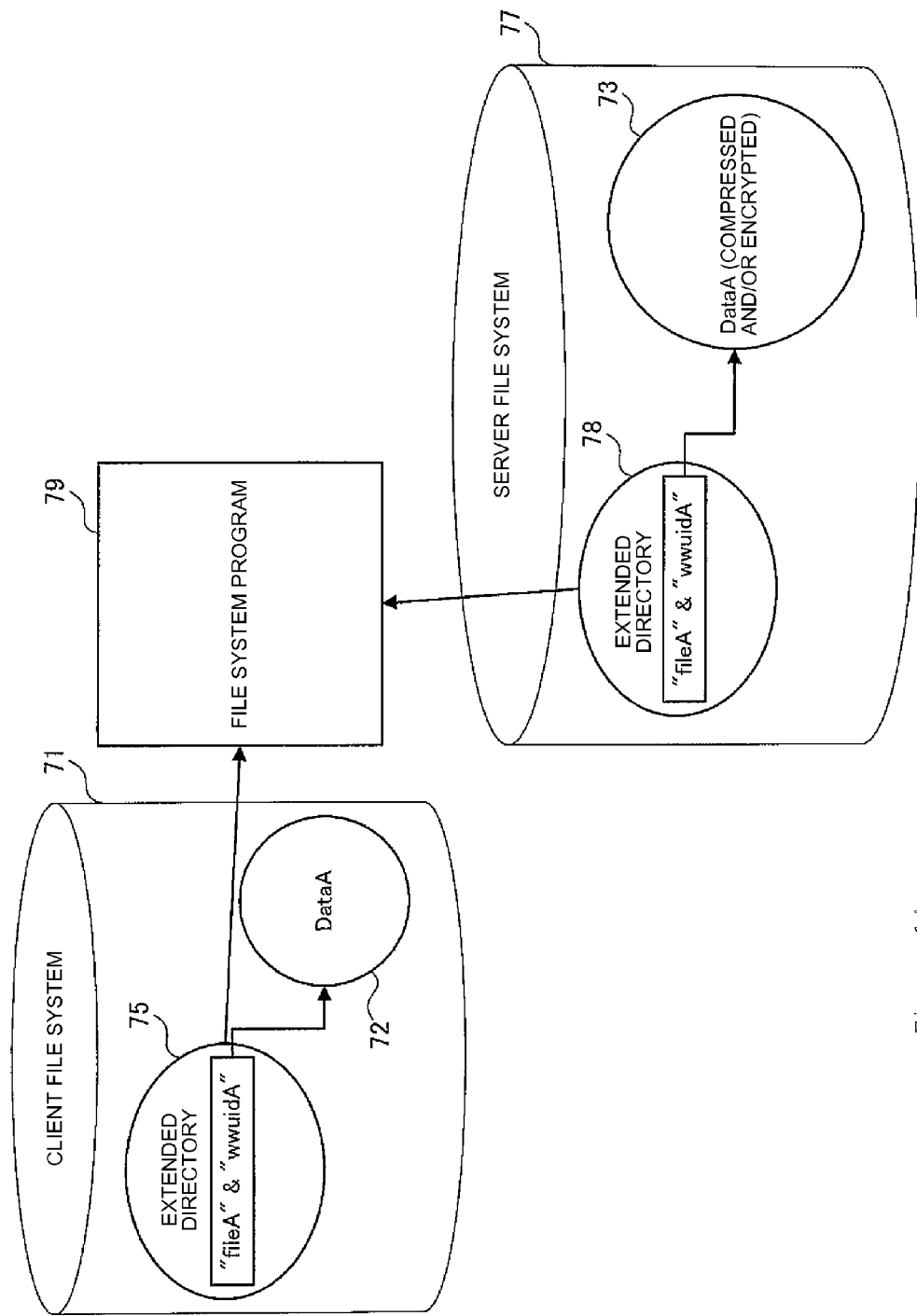
FIG. 14 is a diagram for describing a case where one of two files to be subjected duplication determination is compressed and/or encrypted in the embodiment of the present invention.

FIG. 14 is a diagram for describing this feature. A client file system 71 stores a file 72 therein. Here, the entity of the data in the file 72 is denoted as "DataA." The client file system 71 also stores an extended directory 75 therein. The extended directory 75 stores therein the file name of the file 72 "fileA" in association with the WWUID of the file 72 "wwuidA," and the file 72 is reachable from the extended directory 75 by use of the WWUID "wwuidA." Meanwhile, a server file system 77 stores a file 73 therein. Here, the file 73 is a file obtained by compressing and/or encrypting the file 72. The server file system 77 also stores an extended directory 78 therein. The extended directory 78 stores therein the file name of the file 73 "fileA" in association with the WWUID of the file 73 "wwuidA," and the file 73 is reachable from the extended directory 78 by use of the WWUID "wwuidA." In this state, a file system program 79 detects that the WWUIDs stored respectively in the extended directories 75 and 78 in the client and server file systems 71 and 77 are the same. Accordingly, it is possible to recognize that the files 72 and 73 are the same without having to compare the data between the files 72 and 73.

[Determination of Presence of File Duplication in Distributed File System]

Figure 15:
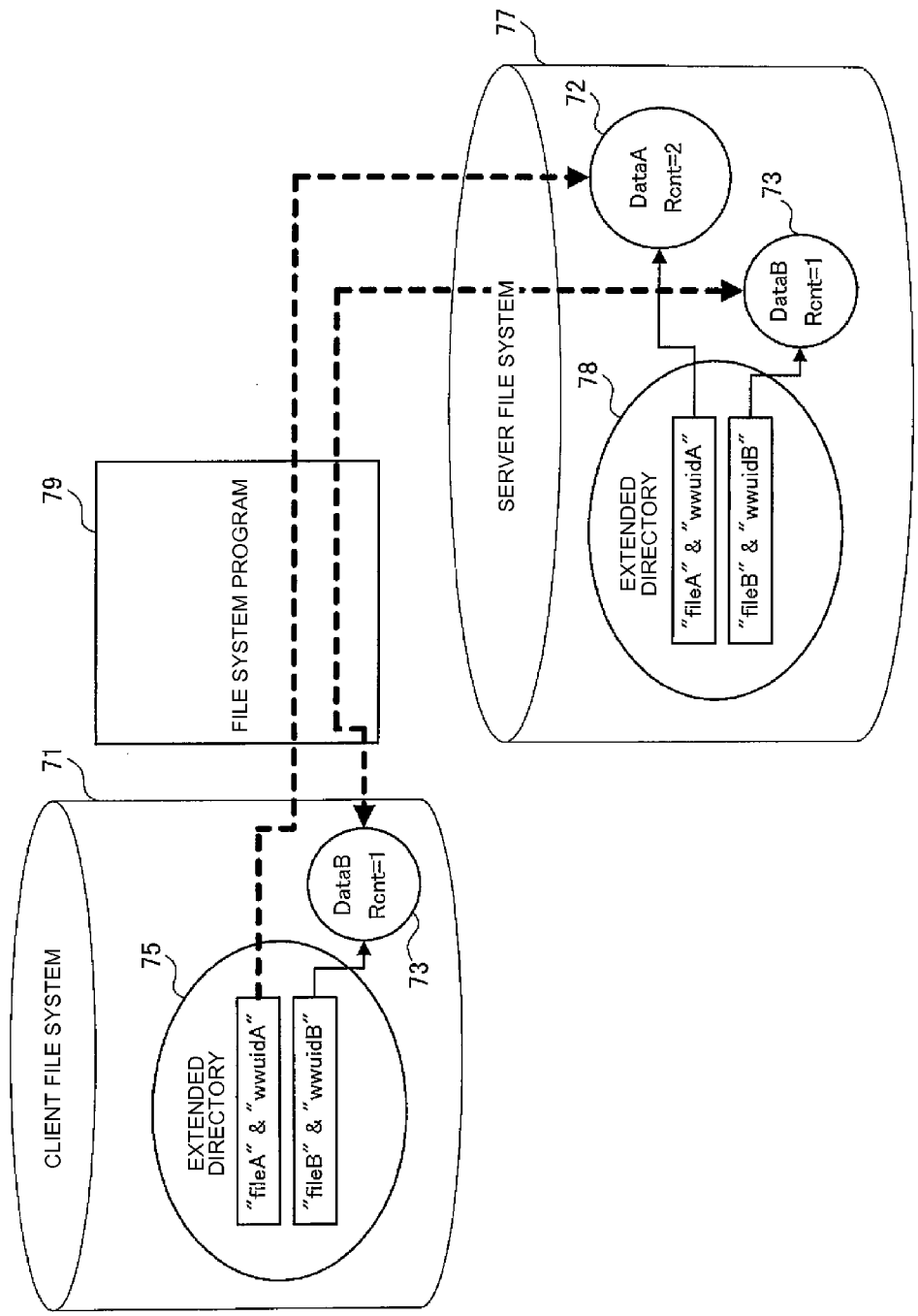
FIG. 15 is a diagram showing deduplication of a file on a distributed file system in the embodiment of the present invention.

FIG. 15 shows an example of applying this embodiment to a distributed file system. In this example, a client file system 71 and a server file system 77 are sub file systems of one file system. Therefore, coherent WWUIDs are assigned by a file system program 79 to files in the client and server file systems 71 and 77. A file 72 will be described first. Here, the entity of the data in the file 72 is denoted as "DataA." In the diagram, it is assumed that the entity of the file 72 has been deleted from the client file system 71 for a capacity-related reason or some other reason. That is, an extended directory 75 in the client file system 71 stores therein the file name of the file 72 "fileA" in association with the WWUID of the file 72 "wwuidA," but the file 72 specifiable by the WWUID does not exist in the client file system 71. In this state, an extended directory 78 in the server file system 77 stores therein the file name of the file 72 "fileA" in association with the WWUID of the file 72 "wwuidA," and the file 72 specifiable by the WWUID exists in the server file system 77. Accordingly, the file system program 79 can easily locate and call the entity of the file 72 from the server file system 77 by using the WWUID.

The file 73 will be described next. Here, the entity of the data in the file 73 is denoted as "DataB." In the diagram, the entity of the file 73 exists in both of the client and server file systems 71 and 77. That is, the extended directory 75 in the client file system 71 stores therein the file name of the file 73 "fileB" in association with the WWUID of the file 73 "wwuidB," and the file 73 specifiable by the WWUID exists in the client file system 71. Likewise, the extended directory 78 in the server file system 77 stores therein the file name of the file 73 "fileB" in association with the WWUID of the file 73 "wwuidB," and the file 73 specifiable by the WWUID exists in the server file system 77. Accordingly, the file system program 79 can recognize file duplication by using the WWUID, as a result, making it easier to determine whether or not the file 73 can be deleted from the client file system 71.

[Distributed File Processing Apparatus]

Next, a distributed file processing apparatus 30 that deletes a file in a distributed file system as mentioned above will be described specifically. Note that this distributed file processing apparatus 30 is assumed to be an apparatus independent of any of a computer including the client file system 71 and a computer including the server file system 77.

Figure 16:
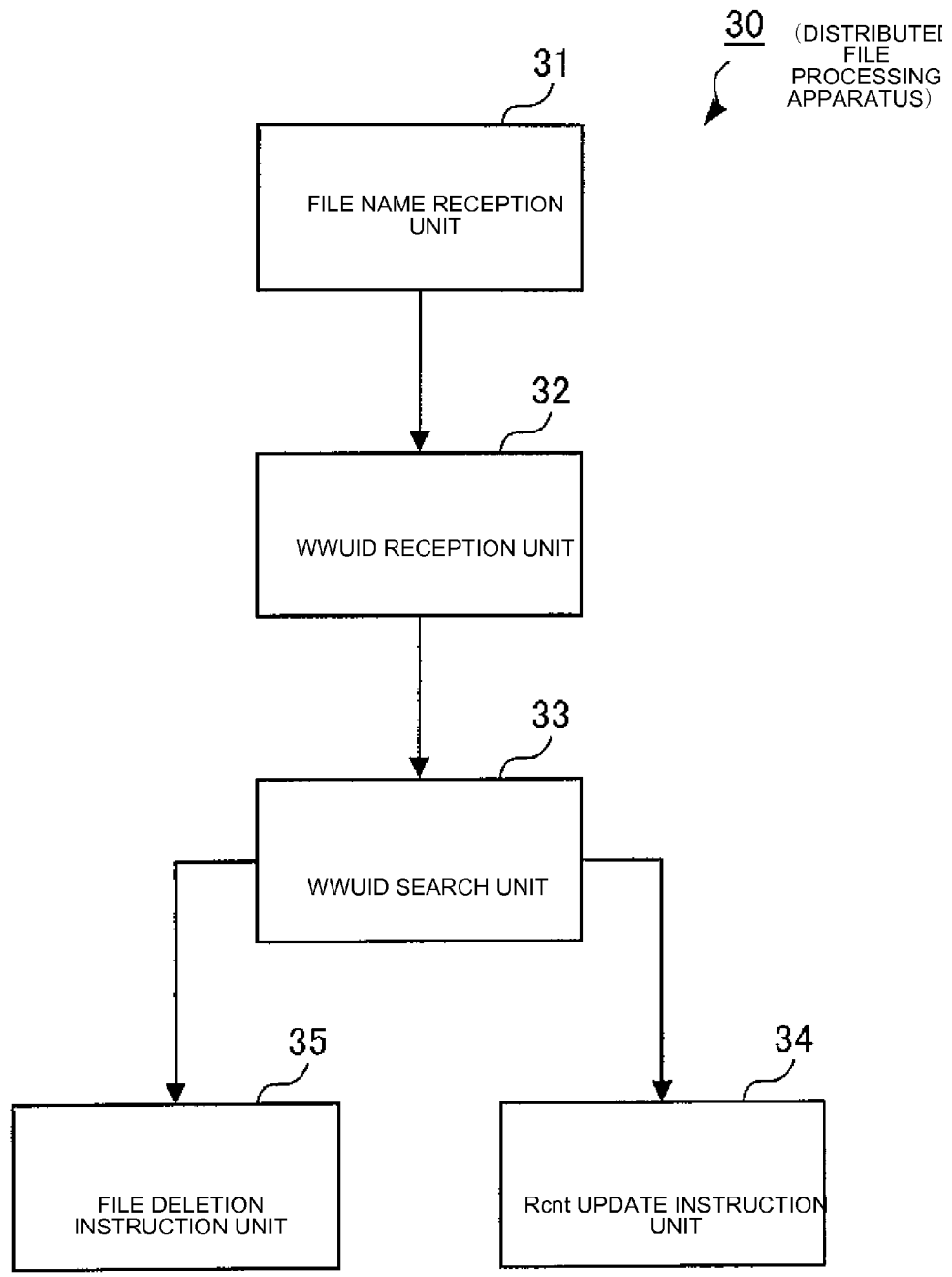
FIG. 16 is a block diagram showing an example of the functional configuration of a distributed file processing apparatus in the embodiment of the present invention.

FIG. 16 is a diagram showing an example of the functional configuration of the distributed file processing apparatus 30. As shown in the diagram, the distributed file processing apparatus 30 includes a file name reception unit 31, a WWUID reception unit 32, a WWUID search unit 33, an Rcnt update instruction unit 34, and a file deletion instruction unit 35. The file name reception unit 31 is configured to receive the file name of a deletion target file.

The WWUID reception unit 32 is configured to receive the WWUID of the deletion target file. Specifically, the WWUID reception unit 32 receives a WWUID that is associated, in the extended directory 75 in the client file system 71, with the file name received by the file name reception unit 31. In this embodiment, the deletion target file is used as an example of a second file stored in a client computer. The WWUID reception unit 32 is provided as an example of a second acquisition unit configured to acquire second identification information assigned to the second file.

The WWUID search unit 33 is configured to search the extended directory 78 in the server file system 77 for the WWUID received by the WWUID reception unit 32. Specifically, the WWUID search unit 33 acquires the WWUID of each saving target file from the extended directory 78 in the server file system 77 and determines whether or not the WWUID matches the WWUID received by the WWUID reception unit 32. In this embodiment, the saving target file is used as an example of a first file stored in a server computer. The WWUID search unit 33 is provided as an example of a first acquisition unit configured to acquire first identification information assigned to the first file. The WWUID search unit 33 is also provided as an example of a determination unit configured to determine whether or not the first identification information and the second identification information match each other.

The Rcnt update instruction unit 34 is configured to instruct the server file system 77 to perform an update process to increment the Rcnt in inode information corresponding to the WWUID by "1," if the WWUID search unit 33 finds the WWUID from the extended directory 78. The file deletion instruction unit 35 is configured to instruct the client file system 71 to delete a file specifiable by an inode number corresponding to the WWUID, if the WWUID search unit 33 finds the WWUID from the extended directory 78. In this embodiment, the file deletion instruction unit 35 is provided as an example of a control unit configured to perform such control that the second file can be deleted from the client computer.

Figure 17:
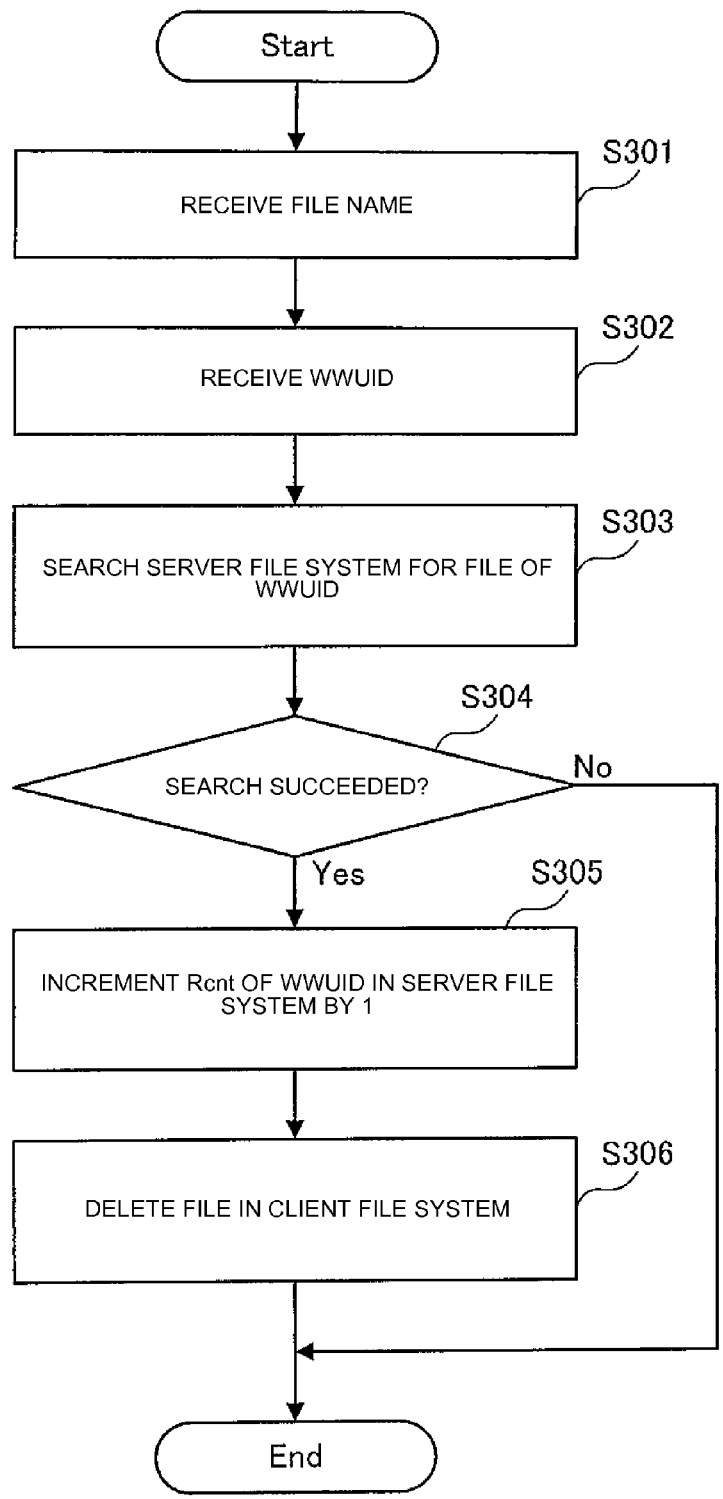
FIG. 17 is a flowchart showing an example of operations of the distributed file processing apparatus in deleting a file in the embodiment of the present invention.

Next, operations of the distributed file processing apparatus 30 will be described. FIG. 17 shows operations of the distributed file processing apparatus 30 in deleting a file in the distributed file system. Note that the operations are performed on condition that the capacity of the client file system 71 reaches or falls below a threshold, for example. In the distributed file processing apparatus 30, the file name reception unit 31 first receives the file name of a deletion target file (step 301). In response to this, the WWUID reception unit 32 receives a WWUID that is associated, in the extended directory 75 in the client file system 71, with the file name received in step 301 (step 302). Thereafter, the WWUID search unit 33 acquires the WWUID received by the WWUID reception unit 32 and searches the extended directory 78 in the server file system 77 for the WWUID (step 303). The WWUID search unit 33 then determines whether or not the WWUID is found from the extended directory 78 (step 304).

If the determination result shows that the WWUID is found from the extended directory 78, the WWUID is handed over from the WWUID search unit 33 to the Rcnt update instruction unit 34. The Rcnt update instruction unit 34 in turn instructs the server file system 77 to increment the Rcnt in inode information corresponding to the WWUID by "1" (step 305). The WWUID is also handed over from the WWUID search unit 33 to the file deletion instruction unit 35. The file deletion instruction unit 35 in turn instructs the client file system 71 to delete a file specifiable by an inode number corresponding to the WWUID (step 306). Note that this deletion instruction includes a deletion instruction for management information such as the inode information corresponding to the WWUID.

On the other hand, if the WWUID is not found from the extended directory 78, no file is deleted from the client file system 71, and the process terminates. Here, the distributed file processing apparatus 30 is assumed to be an apparatus independent of any of the computer including the client file system 71 and the computer including the server file system 77. Note, however, that the distributed file processing apparatus 30 may be implemented in any of these computers. Also, here, a file in the client file system 71 is treated as a deletion target, and a file in the server file system 77 is treated as a saving target. However, it is possible to employ a configuration where a file in the client file system 71 is a saving target, and a file in the server file system 77 is a deletion target.

[Determination of Presence of Duplication of Attachment File Possessed by Multiple Users Due to Distribution of Electronic Mail]

Figure 18:
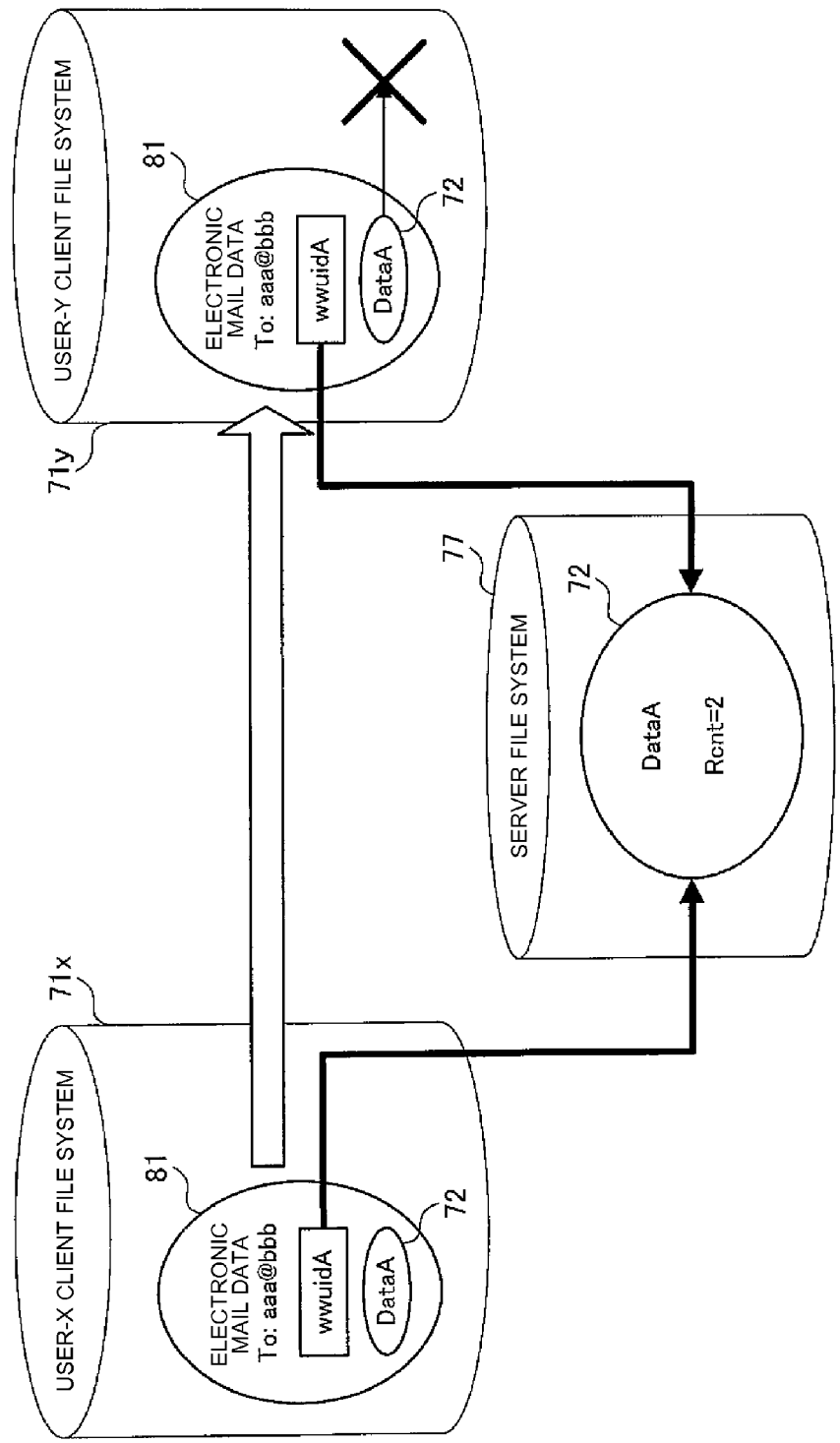
FIG. 18 is a diagram showing deduplication of an attachment file in an electronic mail in the embodiment of the present invention.

FIG. 18 shows an example of applying this embodiment to a case where an electronic mail is sent to distribute an attachment file. In this example, in general, an electronic mail is sent after an attachment file is attached thereto at the sending side, and then a text document is separated from the electronic mail by a mailer program at the receiving side to be visible. By allowing the mailer program to use the file system program of this embodiment, the body of the electronic mail and the attachment file may be associated with each other via a WWUID and saved as two separate files. Here, the sending side and the receiving side both refer to the same server file system. If there exists in the server file system the same file entity as that entity of the attachment file, the receiving side can easily recognize the received attachment file as a duplicate file.

This feature will be described below specifically by referring to FIG. 18. First of all, a server file system 77 stores therein a file 72. Here, the entity of the data in the file 72 is denoted as "DataA." With this state taken into account, consider a case where the file 72 is sent as an attachment file in an electronic mail from a user-X client file system 71x to a user-Y client file system 71y. In this case, electronic mail data 81 including the file 72 and the WWUID of the file 72 "wwuidA" is created in the client file system 71x. The electronic mail data 81 is then sent to the client file system 71y as indicated by a hollow arrow. As a result, the file 72 is, in usual cases, saved in the client file system 71y while being separated from the electronic mail data 81. In this embodiment, however, the mailer program at the sending side extracts the WWUID from the electronic mail data 81 and determines whether or not the WWUID exists in an unillustrated extended directory in the server file system 77. The determination result will show that the WWUID exists, i.e., the file 72 exists duplicate, and therefore the mail program determines that the file 72 can be deleted from the client file system 71y.

[Electronic Mail Processing Apparatus]

Figure 19:
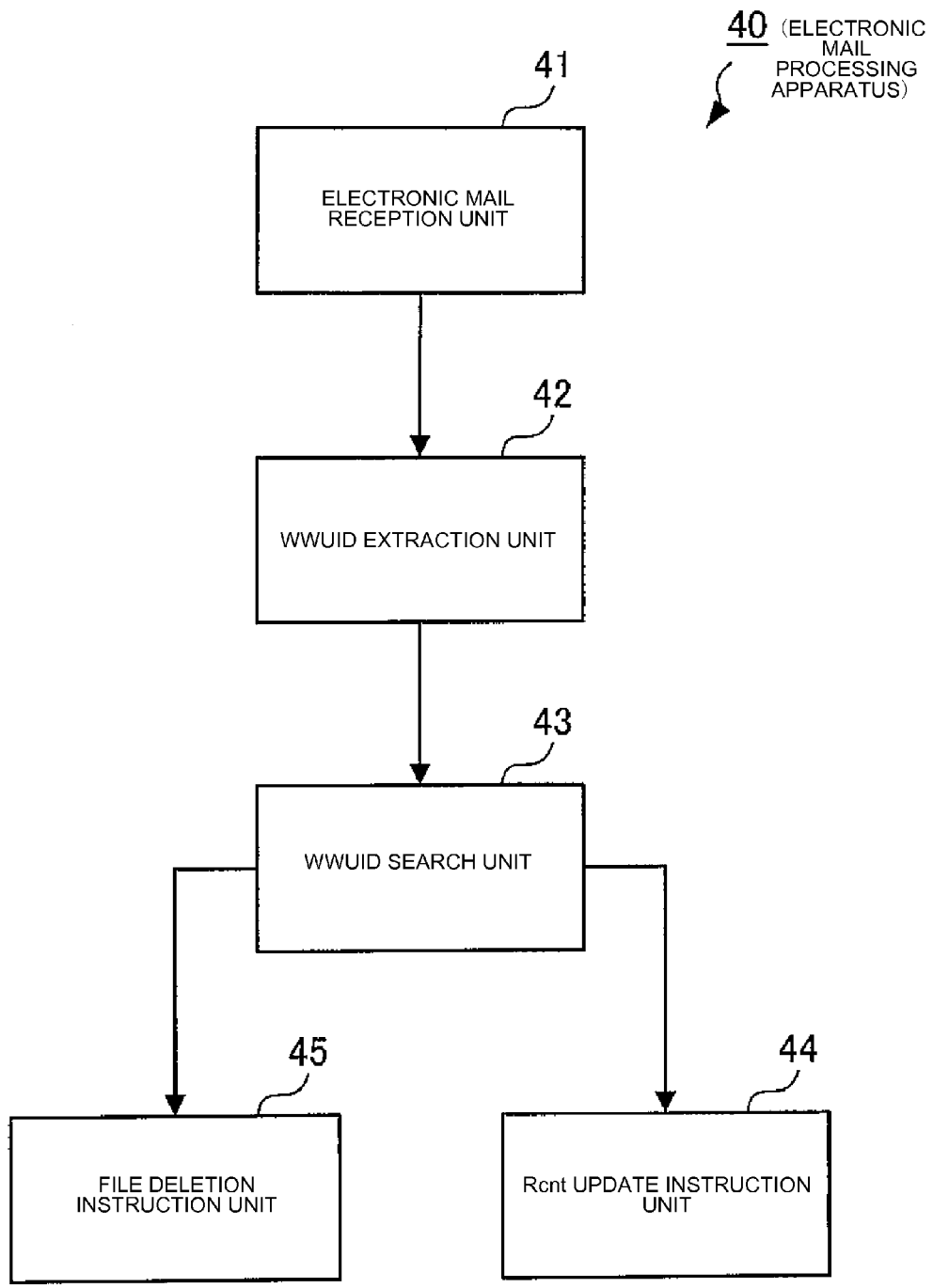
FIG. 19 is a block diagram showing an example of the functional configuration of an electronic mail processing apparatus in the embodiment of the present invention.

Next, an electronic mail processing apparatus 40 that deletes an attachment file in an electronic mail as mentioned above will be described specifically. Note that the electronic mail processing apparatus 40 is assumed to be implemented by the mailer program in the client file system 71y. FIG. 19 is a diagram showing an example of the functional configuration of the electronic mail processing apparatus 40. As shown in the diagram, the electronic mail processing apparatus 40 includes an electronic mail reception unit 41, a WWUID extraction unit 42, a WWUID search unit 43, an Rcnt update instruction unit 44, and a file deletion instruction unit 45. The electronic mail reception unit 41 is configured to receive an electronic mail from a separate computer.

The WWUID extraction unit 42 is configured to receive the WWUID of an attachment file from data in the electronic mail received by the electronic mail reception unit 41. In this embodiment, the attachment file is used as an example of a second file attached to an electronic mail. The WWUID extraction unit 42 is provided as an example of a second acquisition unit configured to acquire second identification information assigned to the second file.

The WWUID search unit 43 is configured to search the extended directory (unillustrated) in the server file system 77 for the WWUID extracted by the WWUID extraction unit 42. Specifically, from the extended directory in the server file system 77, the WWUID search unit 43 acquires the WWUID of a file which is the original version of the attachment file. The WWUID search unit 43 then determines whether or not the WWUID is the same as the WWUID extracted by the WWUID extraction unit 42. In this embodiment, the file being the original version of the attachment file is used as an example of a first file stored in a server computer. The WWUID search unit 43 is provided as an example of a first acquisition unit configured to acquire first identification information assigned to the first file. The WWUID search unit 43 is also provided as an example of a determination unit configured to determine whether or not the first identification information and the second identification information match each other.

The Rcnt update instruction unit 44 is configured to instruct the server file system 77 to perform an update process to increment the Rcnt in inode information corresponding to the WWUID by "1," if the WWUID search unit 43 finds the WWUID from the extended directory. The file deletion instruction unit 45 is configured to instruct the client file system 71y to delete the attachment file, if the WWUID search unit 43 finds the WWUID from the extended directory. In this embodiment, the file deletion instruction unit 45 is provided as an example of a control unit configured to perform such control that the second file can be prevented from being saved in a client computer.

Figure 20:
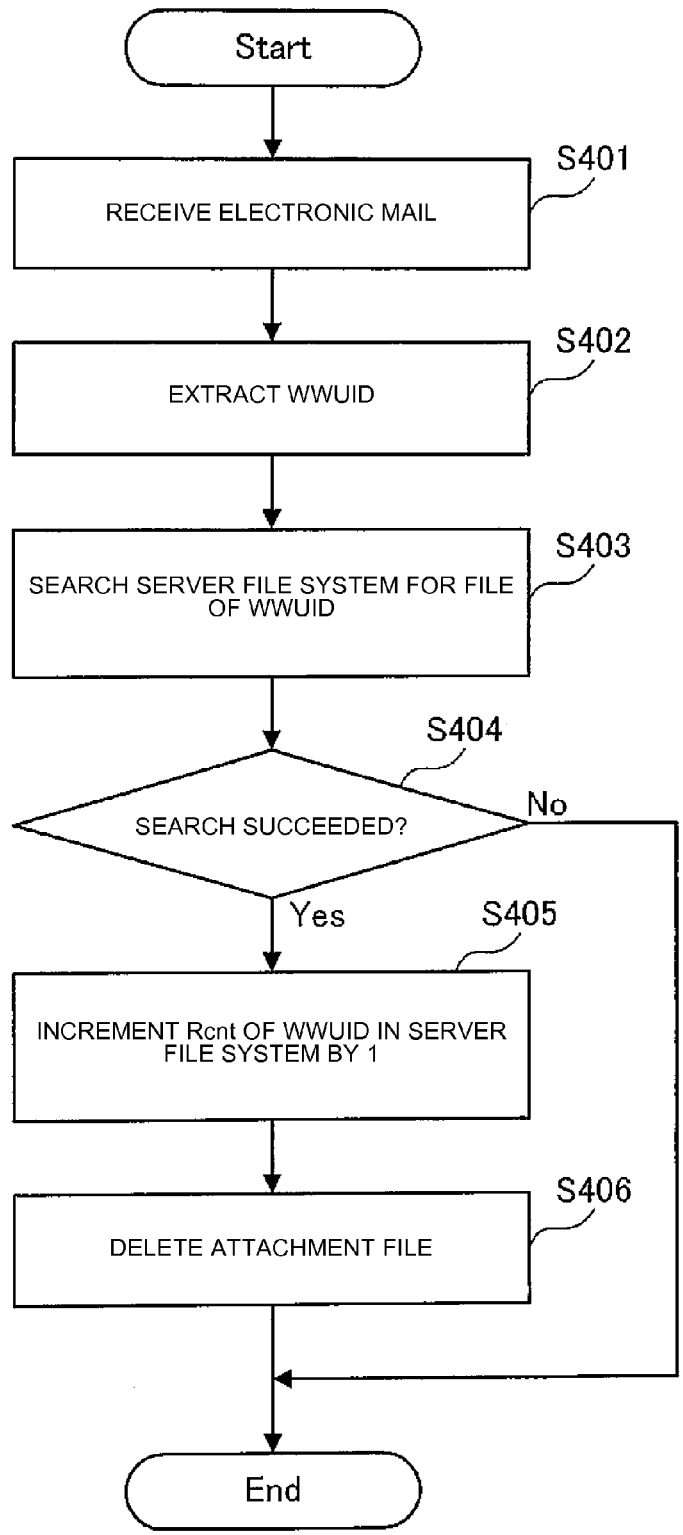
FIG. 20 is a flowchart showing an example of operations of the electronic mail processing apparatus in deleting an attachment file in the embodiment of the present invention.

Next, operations of the electronic mail processing apparatus 40 will be described. FIG. 20 shows operations of the electronic mail processing apparatus 40 in deleting an attachment file. In the electronic mail processing apparatus 40, the electronic mail reception unit 41 first receives an electronic mail from the client file system 71x, for example (step 401). In response to this, the WWUID extraction unit 42 extracts a WWUID from data in the electronic mail received in step 401

(step 402). Note that at this point, an attachment file in the electronic mail is temporarily stored under a predetermined directory in the client file system 71$y$; inode information corresponding to the WWUID of the attachment file is newly created; and "1" is set to the Rcnt in the inode information.

Thereafter, the WWUID search unit 43 acquires the WWUID extracted by the WWUID extraction unit 42, and searches the extended directory in the server file system 77 for the WWUID (step 403). The WWUID search unit 43 then determines whether or not the WWUID is found from the extended directory (step 404). If the determination result shows that the WWUID is found from the extended directory, the WWUID is handed over from the WWUID search unit 43 to the Rcnt update instruction unit 44. The Rcnt update instruction unit 44 in turn instructs the server file system 77 to increment the Rcnt in the inode information corresponding to the WWUID by "1" (step 405). The WWUID is also handed over from the WWUID search unit 43 to the file deletion instruction unit 45. The file deletion instruction unit 45 in turn instructs the client file system 71$y$ to delete a file specifiable by an inode number corresponding to the WWUID, i.e., the temporarily stored attachment file (step 406). Note that this deletion instruction includes a deletion instruction for management information such as the inode information corresponding to the WWUID. On the other hand, if the WWUID is not found from the extended directory, the attachment file is not deleted from the client file system 71$y$, and the process terminates. Here, the electronic mail processing apparatus 40 is assumed to be implemented by the mailer program in the client file system 71$y$. Note, however, that the electronic mail processing apparatus 40 may be an apparatus independent of any of a computer including the client file system 71$y$ and a computer including the server file system 77.

[Avoidance of Partial Duplication between Original and Changed Documents]

Figure 21:
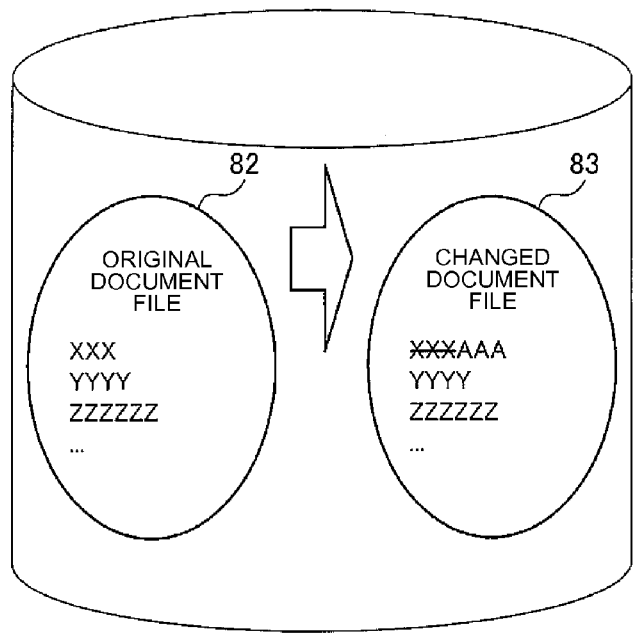
FIGS. 21A and 21B are diagrams for describing elimination of duplication between an original document and a changed document including the original document.
Figure 21:
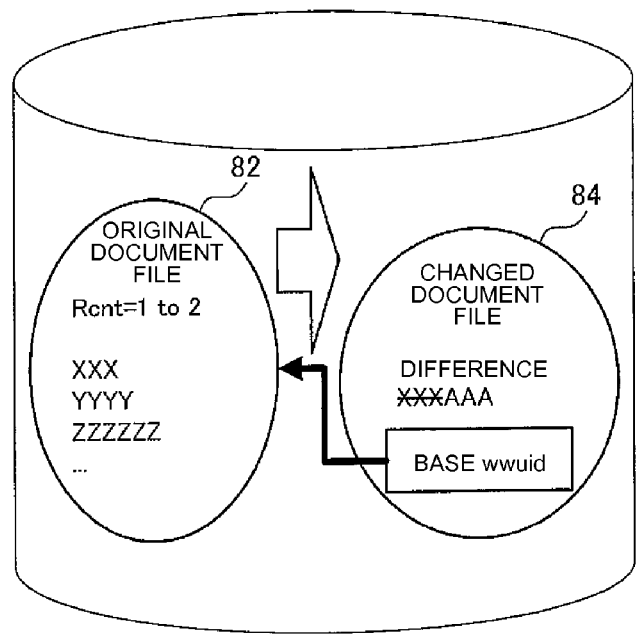

FIGS. 21A and 21B show an example of applying this embodiment to a DTP application. FIG. 21A shows a preexisting DTP application. When an original document file 82 is changed (including adding a review comment, etc.), the preexisting DTP application newly outputs a changed document file 83 including both of information in the original document file 82 and the changed version of the information.

FIG. 21B shows a DTP application of this embodiment. The DTP application of this embodiment uses the file system program of this embodiment to hold the original document file 82 and a changed document file 84 in a linked state by use of a WWUID, thereby making it possible to avoid duplication of the information in the original document file 82. Here, a base WWUID in the changed document file 84 is the WWUID of the original document file 82, and is added to the changed document file 84 by an addition unit implemented by the DTP application. Additionally, the original document file 82 uses an Rcnt to manage the number of pieces of data referring to the original document file 82. The diagram shows a change from a state where the original document file 82 is referred to by one piece of data to a state where it is referred to by two pieces of data. Using an Rcnt to manage the number of pieces of data referring to the original document file 82 as above will prevent the file system program from deleting the entity of the original document file 82 even when the original document file 82 is to be accidentally deleted, as long as the Rcnt is not "0."

In the aforementioned scenarios for deduplication, two files to be subjected to duplication determination are assumed to exist in separate file systems, respectively, and the WWUIDs of the two files are acquired by use of separate acquisition units, respectively. However, two files to be subjected to duplication determination may be assumed to exist in the same file system, and the WWUIDs of the two files may be acquired by use of one acquisition unit. Moreover, in the aforementioned scenarios for deduplication, file deduplication is performed through an operation such as "not saving one of two files" or "deleting one of two files," but the deduplication is not limited thereto. In a broad sense, the deduplication may be performed through any operation that prevents two files from being stored as duplicate files. In that case, a function to perform this operation may be said to be an example of the control unit configured to perform such control that a first file and a second file can be prevented from being stored as duplicate files in a file system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for file deduplication in a file system by a processor, comprising:
    receiving one of a new file creation instruction, a file copy instruction, and a file update instruction specifying at least a file directory and a file name;
    storing or updating inode information for a file upon creation, copying, or update of the file;
    acquiring identification information which is newly assigned to the file upon creation, copying, or update of the file and is inherited by the file from a different file if the file is a copy of the different file, to thereby make a content of the file identifiable, wherein the identification information includes world wide unique identification (WWUID);
    storing the identification information and an inode information number in the file directory;
    storing the file name together and the identification information in an extended directory;
    determining whether or not first identification information and second identification information match each other, the first identification information being the identification information acquired by the acquisition unit and assigned to a first file, the second identification information being the identification information acquired by the acquisition unit and assigned to a second file;
    if the first identification information is determined to match the second identification information, preventing the first file and the second file from being stored as duplicate files in the file system;
    registering, in count information, an increase in the number of pieces of identification information associated with the first file, when the second identification information becomes associated with the first file, the count information indicating the number of pieces of identification information associated with the first file, wherein the count information is a reference count number of the WWUID;
    registering, in the count information, a decrease in the number of pieces of identification information associated with the first file, in response to an instruction to delete the first management information; and
    deleting the first management information in response to the instruction to delete the first management information, and to also delete the first file if the count information after the registration by the second registration unit indicates that no identification information is associated with the first file.

2. The method according to claim 1, further comprising:
    acquiring the first identification information assigned to the first file backed up to the file system at a first time point, from first management information for managing each file backed up to the first system at the first time point; and
    acquiring the second identification information assigned to the second file to be backed up to the file system at a second time point subsequent to the first time point, and
    if the first identification information and the second identification information match each other, preventing the first and second identification information from being copied to the file system at the second time point and that the second identification information is included in second management information and associated with the first file, the second management information for managing each file backed up at the second time point.

3. The method according to claim 1, further comprising
    acquiring the first identification information assigned to the first file stored in a server computer, from first management information for managing each file stored in the server computer,
    acquiring the second identification information assigned to the second file stored in a client computer, from second management information for managing each file stored in the client computer, and
    if the first identification information and the second identification information match each other, deleting the second file from the client computer.

4. The method according to claim 1, further comprising:
acquiring the first identification information assigned to the first file stored in a server computer, from management information for managing each file stored in the server computer; and
acquiring the second identification information from data in an electronic mail received by a client computer, the second identification information being assigned to the second file attached to the electronic mail, and
if the first identification and the second identification match each other, preventing the second file from being saved in the client computer.

\* \* \* \* \*